(12) United States Patent
Kimura

(10) Patent No.: US 11,698,617 B2
(45) Date of Patent: Jul. 11, 2023

(54) WELD BEAD CUTTING DEVICE AND WELD BEAD CUTTING METHOD

(71) Applicant: TOYOTA JIDOSHA KABUSHIKI KAISHA, Toyota (JP)

(72) Inventor: Miki Kimura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 544 days.

(21) Appl. No.: 17/005,716

(22) Filed: Aug. 28, 2020

(65) Prior Publication Data

US 2021/0170512 A1    Jun. 10, 2021

(30) Foreign Application Priority Data

Dec. 10, 2019    (JP) ................................ 2019-222878

(51) Int. Cl.
     *G05B 19/401*      (2006.01)
     *B23B 1/00*      (2006.01)
     *B21C 37/08*      (2006.01)
     *B23D 79/02*      (2006.01)

(52) U.S. Cl.
     CPC ........ *G05B 19/401* (2013.01); *B21C 37/0807* (2013.01); *B21C 37/0811* (2013.01); *B23B 1/00* (2013.01); *B23B 2220/08* (2013.01); *B23D 79/021* (2013.01); *G05B 2219/37217* (2013.01); *G05B 2219/49386* (2013.01)

(58) Field of Classification Search
     CPC ........... G05B 2219/37217; G05B 2219/49386; G05B 19/401; B23D 79/021; B21C 37/0807; B21C 37/0811; B23B 1/00
     See application file for complete search history.

(56) References Cited

U.S. PATENT DOCUMENTS

| | | | |
|---|---|---|---|
| 10,029,334 | B2 * | 7/2018 | Kim ..................... B23K 31/125 |
| 2002/0088806 | A1 | 7/2002 | Takaku et al. |
| 2005/0147289 | A1 * | 7/2005 | Kodama ............. B21C 37/0811 |
| | | | 382/152 |

(Continued)

FOREIGN PATENT DOCUMENTS

| | | |
|---|---|---|
| CN | 107363668 A | 11/2017 |
| JP | 2002-188794 A | 7/2002 |

(Continued)

*Primary Examiner* — Ronald D Hartman, Jr.
(74) *Attorney, Agent, or Firm* — Oblon, McClelland, Maier & Neustadt, L.L.P.

(57) ABSTRACT

Positions of both end edges of a weld bead in a bead width direction are measured over the entire circumference of a liner in a circumferential direction of the liner. Based on information on the position of the end edge, bead profile information being information on a shape of the end edge of the weld bead over the entire circumference of the liner in the circumferential direction is created. Based on this bead profile information, machining information of the liner per rotation of the liner being position information of a cutting tool in the bead width direction per phase in the circumferential direction of the liner is created so that a moving locus of the cutting tool relative to the liner along the circumferential direction of the liner approximates the shape of the end edge of the weld bead over the entire circumference of the liner in the circumferential direction.

6 Claims, 16 Drawing Sheets

(56) References Cited

U.S. PATENT DOCUMENTS

| | | | |
|---|---|---|---|
| 2014/0332504 A1* | 11/2014 | Hamada | ................. B23K 31/00 901/3 |
| 2019/0323828 A1* | 10/2019 | Hiramoto | ............... B23K 31/00 |
| 2020/0139447 A1 | 5/2020 | Kimura | |

FOREIGN PATENT DOCUMENTS

| JP | 2004117053 A | * | 4/2004 | ......... B21C 37/0811 |
| JP | 2006150369 A | * | 6/2006 | ............. B23K 37/08 |
| JP | 3821909 B2 | * | 9/2006 | ............. B24B 27/00 |
| JP | 2011106821 A | * | 6/2011 | ................ G01B 7/06 |
| JP | 2019095235 A | * | 6/2019 | ............. G01B 21/20 |
| JP | 2020-69617 A | | 5/2020 | |
| KR | 20220026318 A | * | 3/2022 | ............... B23C 3/12 |
| KR | 20220163297 A | * | 12/2022 | ........... B23K 26/352 |
| WO | WO-03093761 A1 | * | 11/2003 | ......... B21C 37/0811 |

\* cited by examiner

WELD BEAD CUTTING DEVICE AND WELD BEAD CUTTING METHOD

CROSS-REFERENCE TO RELATED APPLICATION

This application claims priority to Japanese Patent Application No. 2019-222878 filed on Dec. 10, 2019, incorporated herein by reference in its entirety.

BACKGROUND

1. Technical Field

The disclosure relates to a weld bead cutting device and a weld bead cutting method. In particular, the disclosure relates to an improvement in a weld bead cutting device and a weld bead cutting method configured to remove, by cutting, a weld bead that is generated on the outer circumference of a welding portion when annular end edges of two resin members on their open sides are butted and welded to each other.

2. Description of Related Art

Conventionally, as disclosed in Japanese Unexamined Patent Application Publication No. 2002-188794 (JP 2002-188794 A), a liner (a pressure vessel made of resin) is produced by joining a plurality of resin members (resin molded products) to each other by welding. JP 2002-188794 A discloses that the liner is produced by heating and melting the open-side end edges of a plurality of resin liner portions having a generally cylindrical shape and then butting and welding the end edges of the liner portions to each other. A reinforcing portion (referred to as a "shell" in JP 2002-188794 A) is provided, for example, by winding carbon fibers around the outer circumference of the liner so that the strength of the liner is ensured.

When producing the liner, a weld bead is generated on the outer circumference of a welding portion between the liner portions. There is a possibility that the weld bead may cause breakage of the carbon fibers when winding the carbon fibers around the outer circumference of the liner. Further, when the weld bead is present, there is also a possibility that a gap may be made between the outer peripheral surface of the liner and the carbon fibers, resulting in adversely affecting the strength of a tank (a tank formed by providing the reinforcing portion on the outer circumference of the liner).

In view of this, the cutting machining is performed to remove the weld bead by cutting at the stage before the winding operation of the carbon fibers. As the cutting machining, the automatic cutting using a cutting unit with a lathe and so on is performed for the purpose of enhancing the work efficiency.

SUMMARY

FIG. 25 illustrates a section of a part of a liner b at a generation portion of a weld bead a (hatching representing a section is omitted). In FIG. 25, broken lines indicate the shapes of liner portions c, d before welding. When cutting the weld bead a, a cutting tool e is advanced toward the outer peripheral surface of the liner b (see arrow f in FIG. 25) while rotating the liner b about its central axis O, and the cutting tool e is moved in the width direction of the weld bead a (the direction along the central axis O of the liner b) at a predetermined feed pitch (a predetermined feed pitch per rotation of the liner b) (see arrow g in FIG. 25).

When the sectional shape of the weld bead a is a predetermined shape and both first and second end edges of the weld bead a in its width direction are located within a prescribed range from a cutting start position h to a cutting end position i in the feed direction of the cutting tool e (the moving direction along the width direction of the weld bead a), the weld bead a is sequentially cut in its width direction by the movement of the cutting tool e from the first end edge side toward the second end edge side of the weld bead a in its width direction so that a cutting chip (a cutting chip removed from the liner b due to cutting of a part of the weld bead a) having a predetermined sectional shape (a sectional shape according to the predetermined feed pitch) is sequentially generated. For example, at the initial time of the start of the cutting machining, in the situation where the liner b makes one rotation so that the cutting tool e is moved by one feed pitch (the situation where the cutting tool e is moved to j in FIG. 25), a portion k, hatched in FIG. 25, of the weld bead a is removed as a cutting chip from the liner b.

A suction device (not illustrated) for recovering a cutting chip is disposed under the cutting tool e. The suction device includes a suction port that is open upward, and is configured to suck and recover a cutting chip by generating an air flow from the suction port toward the inside of the suction device.

However, there are cases where the weld bead a has a variation in its width or in the positions of the first and second end edges in its width direction, along the circumferential direction of the liner b. For example, with an increase in the size of the weld bead a due to the outside air temperature at the time of welding, or due to dimensional variation or density variation of the liner portions c, d before welding, the weld bead a is subjected to a variation in its width or in the positions of the first and second end edges in its width direction.

FIG. 26 illustrates a section of a part of the liner b at a generation portion of the weld bead a when the first end edge of the weld bead a on its one side (the end edge of the weld bead a on the right side in FIG. 26) is largely displaced to the right side. In this case, the position of the end edge of the weld bead a on the right side is located rightward of the cutting start position h in the feed direction of the cutting tool e. That is, the position of the cutting tool e at the start of cutting the weld bead a is a position closer to the center side than the position of the first end edge of the weld bead a in its width direction so that the cutting by the cutting tool e is started from this position. In this situation, the sectional area of a cutting chip generated when the cutting by the cutting tool e is started becomes large (see a portion m hatched in FIG. 26; a portion to be a cutting chip). Such a cutting chip with the large sectional area has a high rigidity and thus is not easily bent, and therefore, there is a possibility that the cutting chip may impede the suction and recovery by getting caught in the suction port of the suction device.

In order to avoid such a situation, it is conceivable that the range from the cutting start position h to the cutting end position i in the feed direction of the cutting tool e is set large in advance. For example, in FIG. 26, the position of h' is set as a cutting start position and the position of i' is set as a cutting end position so that even when there is a variation in the positions of the first and second end edges of the weld bead a in its width direction, it is possible to generate a cutting chip, having a predetermined sectional shape (a sectional shape that prevents a too high rigidity), from the first end edge to the second end edge of the weld bead a in its width direction.

However, in this case, in the situation where there is no variation in the positions of the first and second end edges of the weld bead a in its width direction, the distance in which the cutting tool e is not in contact with the weld bead a (the so-called idle distance of the cutting tool e) is prolonged so that it is difficult to shorten the machining time.

Even in the situation where a cutting chip with a large sectional area is generated, when the situation is such that a cutting chip generated earlier is small in sectional area and is already sucked and recovered into the suction device and further that the cutting chip is generated continuously (not broken off), even the cutting chip with the large sectional area can be easily recovered (by being pulled into the suction device by the cutting chip sucked and recovered earlier).

That is, in order to recover a cutting chip well, it is necessary that the cutting chip having a predetermined sectional shape (a sectional shape that prevents a too high rigidity) be generated in the situation where there is a possibility that the cutting chip is not generated continuously (there is a possibility that the cutting chip is broken off), and it is necessary that the cutting chip be generated continuously (without being broken off) in the situation where there is a possibility that the cutting chip with a large sectional area is generated.

The disclosure has been made in view of such circumstances, and it is an object of the disclosure to provide a weld bead cutting device and a weld bead cutting method that make it possible to generate a cutting chip that can be easily recovered.

A first aspect of the disclosure relates to a weld bead cutting device configured to cut a weld bead generated on an outer circumference of a welding portion when annular end edges of two resin members on open sides of the two resin members are butted and welded to each other, the weld bead cutting device configured to cut the weld bead by rotating a workpiece, formed by at least the two resin members welded to each other, about a central axis extending in a direction along a butting direction of the two resin members, and by moving a cutting tool at a predetermined feed pitch along a bead width direction being the direction along the butting direction per rotation of the workpiece. The weld bead cutting device includes a bead end edge position measuring device, a bead profile information creation part, a machining information creation part, and a cutting tool feed control part. The bead end edge position measuring device is configured to measure a position of at least one of both end edges of the weld bead in the bead width direction over an entire circumference of the workpiece in a circumferential direction of the workpiece. The bead profile information creation part is configured to, based on information on the position of the end edge of the weld bead in the bead width direction over the entire circumference of the workpiece in the circumferential direction measured by the bead end edge position measuring device, create bead profile information being information on a shape of the end edge of the weld bead over the entire circumference of the workpiece in the circumferential direction. The machining information creation part is configured to, based on the bead profile information created by the bead profile information creation part, create machining information of the workpiece per rotation of the workpiece being position information of the cutting tool in the bead width direction per phase in the circumferential direction of the workpiece so that a moving locus of the cutting tool relative to the workpiece along the circumferential direction of the workpiece approximates the shape of the end edge of the weld bead over the entire circumference of the workpiece in the circumferential direction per rotation of the workpiece rotating about the central axis. The cutting tool feed control part is configured to, according to the machining information created by the machining information creation part, control a position of the cutting tool in the bead width direction per rotation of the workpiece rotating about the central axis.

With this configuration, based on the information on the position of the end edge of the weld bead in the bead width direction over the entire circumference of the workpiece in the circumferential direction measured by the bead end edge position measuring device, the bead profile information over the entire circumference of the workpiece in the circumferential direction is created. Based on this bead profile information, the machining information of the workpiece per rotation of the workpiece being the position information of the cutting tool in the bead width direction per phase in the circumferential direction of the workpiece is created so that the moving locus of the cutting tool relative to the workpiece approximates the shape of the end edge of the weld bead per rotation of the workpiece. According to this machining information, the position of the cutting tool in the bead width direction per rotation of the workpiece is controlled. Therefore, the shape of a cutting chip generated by cutting can be adjusted as desired so that it is possible to generate a cutting chip having a predetermined sectional shape (a sectional shape that prevents a too high rigidity), or to generate a cutting chip that is continuous (not broken off). As a result, it is possible to generate a cutting chip that can be easily recovered.

In the weld bead cutting device according to the first aspect, the machining information creation part may be configured to create machining information in which the feed pitch of the cutting tool per rotation of the workpiece is set to a dimension that causes a width of a cutting chip to become equal to or less than a predetermined dimension, the cutting chip generated to have the width corresponding to the feed pitch, and in which the feed pitch of the cutting tool per rotation of the workpiece is set to be constant from a cutting start position of the cutting tool to a cutting end position of the cutting tool in the bead width direction.

With this configuration, in a cutting process of the weld bead by the cutting tool, the width of a cutting chip generated by moving the cutting tool from the cutting start position to the cutting end position in the bead width direction becomes equal to or less than the dimension of the feed pitch. This feed pitch is set to a dimension that causes the width of a cutting chip generated to become equal to or less than a predetermined dimension. Therefore, the width of a cutting chip can be limited so that it is possible to generate a cutting chip having a sectional shape that prevents a too high rigidity. Consequently, even in the situation where there is a possibility that a cutting chip is not generated continuously (there is a possibility that a cutting chip is broken off), it is possible to generate a cutting chip having a sectional shape that prevents a too high rigidity so that it is possible to generate a cutting chip that can be easily recovered.

In the weld bead cutting device according to the first aspect, the bead end edge position measuring device may be configured to measure the positions of both end edges of the weld bead in the bead width direction over the entire circumference of the workpiece in the circumferential direction; the bead profile information creation part may be configured to, based on information on the positions of both end edges of the weld bead in the bead width direction over the entire circumference of the workpiece in the circumferential direction measured by the bead end edge position measuring device, create bead profile information being information on the shapes of both end edges of the weld bead over the entire circumference of the workpiece in the circumferential direction; and the machining information creation part may be configured to create machining information in which the feed pitch of the cutting tool per phase in the circumferential direction of the workpiece is changed so that the position of the cutting tool in the bead width direction per phase in the circumferential direction of the workpiece from a cutting start position to a cutting end position in the bead width direction is located closer to a center side of the weld bead than the positions of both end edges of the weld bead per rotation of the workpiece.

With this configuration, by changing the feed pitch per phase in the circumferential direction of the workpiece, the position of the cutting tool in the bead width direction per phase in the circumferential direction of the workpiece from the cutting start position to the cutting end position in the bead width direction is located closer to the center side of the weld bead than the positions of both end edges of the weld bead per rotation of the workpiece. That is, the cutting tool does not straddle the end edge of the weld bead while moving from the cutting start position to the cutting end position. Therefore, even in the situation where there is a possibility that a cutting chip with a large sectional area is generated, since the cutting chip is generated continuously (not broken off), the cutting chip is, for example, pulled into a suction device by a cutting chip generated earlier. Consequently, also in this, it is possible to generate a cutting chip that can be easily recovered.

The weld bead cutting device according to the first aspect may further include: surface position measuring devices configured to respectively measure, along the circumferential direction, positions of outer peripheral surfaces of the two resin members on both sides of the welding portion in the direction along the butting direction; a profile machining data creation part configured to, based on information on the positions of the outer peripheral surfaces on both sides of the welding portion measured by the surface position measuring devices, create profile machining data by comparing information on the positions of the outer peripheral surfaces in a same phase in the circumferential direction and extracting the information on the position of the outer peripheral surface located on an outer peripheral side; and a cutting tool advance and retreat control part configured to, according to the profile machining data created by the profile machining data creation part or machining data obtained by correcting the profile machining data, adjust an advance-retreat position of the cutting tool relative to the outer peripheral surface of the workpiece rotating about the central axis so that a distance between the position of the outer peripheral surface per phase in the circumferential direction in the data and a position of a cutting blade of the cutting tool is maintained constant.

The cutting of the weld bead by adjusting the advance-retreat position of the cutting tool is applied as finish machining that is performed after the cutting is performed by moving the cutting tool in the bead width direction as described above. That is, this cutting is applied as the machining that further cuts the weld bead slightly remaining at the time of the completion of the cutting (rough machining) performed by moving the cutting tool in the bead width direction.

With this configuration, the cutting tool is advanced and retreated to follow the position of the outer peripheral surface of one of the two resin members (e.g. the position of the outer peripheral surface located on the outer peripheral side). When the outer peripheral surface is spaced away from the cutting tool, the cutting tool is advanced, and conversely, when the outer peripheral surface approaches the cutting tool, the cutting tool is retreated. Therefore, even when the section of the workpiece is not a perfect circle, it is possible to cut the weld bead well with high accuracy over its entirety in the circumferential direction. For example, if the tip position of the cutting blade of the cutting tool is set to align with the proximal end position of the weld bead, it is possible to remove the weld bead completely so that the level difference due to the weld bead does not occur.

In the weld bead cutting device according to the first aspect, the workpiece may be a liner used for a hydrogen tank.

Since hydrogen gas has a low molecular weight and a small atomic size, a material having a high gas barrier property is employed for the liner that is used for the hydrogen tank. This type of material has a particularly high melting point and high crystallinity, and it is difficult to mold this type of material into a predetermined shape. Further, since a variation in shrinkage factor is large in respective portions at the time of cooling after molding, it is difficult mold this type of material into a perfect circle. Even in the case of a workpiece that is molded of this type of material, the disclosure can cut a weld bead well over its entirety in the circumferential direction and thus is particularly effective.

A second aspect of the disclosure relates to a weld bead cutting method configured to cut a weld bead generated on an outer circumference of a welding portion when annular end edges of two resin members on open sides of the two resin members are butted and welded to each other, the weld bead cutting method configured to cut the weld bead by rotating a workpiece, formed by at least the two resin members welded to each other, about a central axis extending in a direction along a butting direction of the two resin members, and by moving a cutting tool at a predetermined feed pitch along a bead width direction being the direction along the butting direction per rotation of the workpiece. The weld bead cutting method includes a bead end edge position measuring step, a bead profile information creation step, a machining information creation step, and a cutting tool feed control step. In the bead end edge position measuring step, a position of at least one of both end edges of the weld bead in the bead width direction is measured over an entire circumference of the workpiece in a circumferential direction of the workpiece. In the bead profile information creation step, based on information on the position of the end edge of the weld bead in the bead width direction over the entire circumference of the workpiece in the circumferential direction measured by the bead end edge position measuring step, bead profile information being information on a shape of the end edge of the weld bead over the entire circumference of the workpiece in the circumferential direction is created. In the machining information creation step, based on the bead profile information created by the bead profile information creation step, machining information of the workpiece per rotation of the workpiece being position information of the cutting tool in the bead width direction per phase in the circumferential direction of the workpiece is created so that a moving locus of the cutting tool relative to the workpiece along the circumferential direction of the workpiece approximates the shape of the end edge of the weld bead over the entire circumference of the workpiece in the circumferential direction per rotation of the workpiece rotating about the central axis. In the cutting tool feed control step, according to the machining information created by the machining information creation step, a position of the cutting tool in the bead width direction per rotation of the workpiece rotating about the central axis is controlled.

Also with this configuration, the shape of a cutting chip generated by cutting can be adjusted as desired so that it is possible to generate a cutting chip having a predetermined sectional shape (a sectional shape that prevents a too high rigidity), or to generate a cutting chip that is continuous (not broken off). As a result, it is possible to generate a cutting chip that can be easily recovered.

According to the disclosure, based on the bead profile information created based on the information on the position of the end edge of the weld bead in the bead width direction over the entire circumference of the workpiece in the circumferential, the machining information of the workpiece per rotation of the workpiece being the position information of the cutting tool in the bead width direction per phase in the circumferential direction of the workpiece is created so that the moving locus of the cutting tool relative to the workpiece approximates the shape of the end edge of the weld bead per rotation of the workpiece. According to this machining information, the position of the cutting tool in the bead width direction per rotation of the workpiece is controlled. Therefore, the shape of a cutting chip generated by cutting can be adjusted as desired so that it is possible to generate a cutting chip having a predetermined sectional shape, or to generate a cutting chip that is continuous. As a result, it is possible to generate a cutting chip that can be easily recovered.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the disclosure will be described with reference to the drawings. In this embodiment, a description will be given of a case where the disclosure is applied as a weld bead cutting device and a weld bead cutting method configured to remove, by cutting, a weld bead that is generated on the outer circumference of a liner of a resin tank.

Configuration of Tank

Before describing the weld bead cutting device and the weld bead cutting method, the configuration of the tank will be described.

Figure 1:
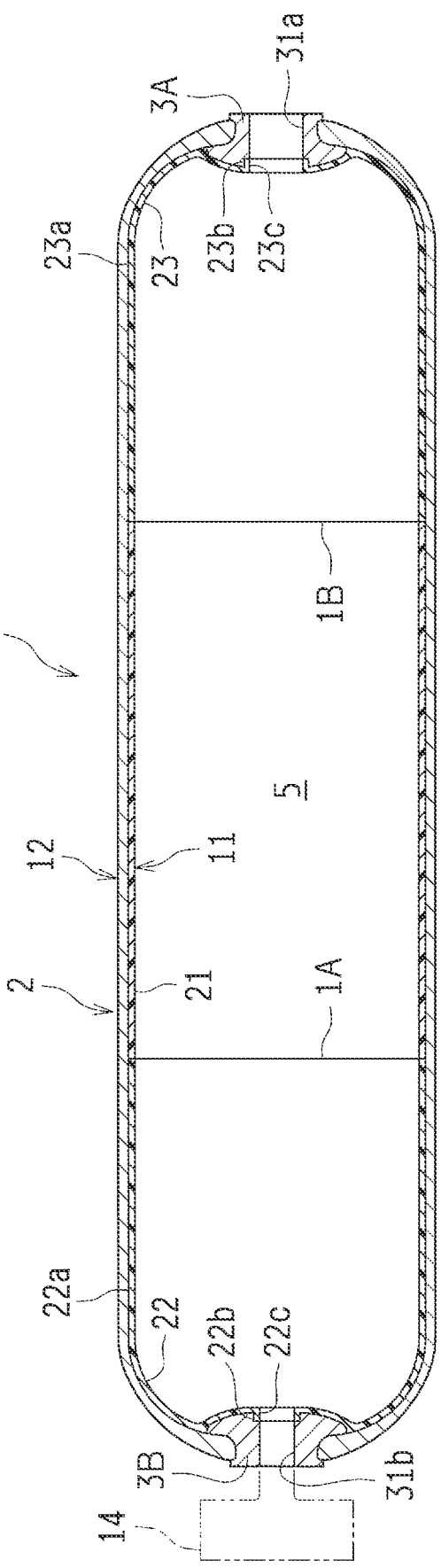
FIG. 1 is a sectional view of a tank taken along its axial direction according to an embodiment.

FIG. 1 is a diagram illustrating a section of a tank 1 taken along its axial direction. As illustrated in FIG. 1, the tank 1 includes a tank body 2 having a sealed cylindrical shape as a whole, and caps 3A, 3B respectively attached to both end portions (a first side portion and a second side portion) of the tank body 2 in its longitudinal direction (axial direction).

The inside of the tank body 2 serves as a storage space 5 for storing gas. The tank 1 can be filled with gas at normal pressure or gas at a pressure higher than the normal pressure.

For example, in a fuel cell system, fuel gas (hydrogen) filled in the tank 1 in a high pressure state is reduced in pressure and supplied for power generation in the fuel cell.

The tank body 2 includes a liner 11 (an inner shell) and a reinforcing portion 12 (an outer shell). The liner 11 is made of a resin material excellent in gas barrier property (a multilayer material containing an ethylene vinyl alcohol material, a nylon material, or the like). The reinforcing portion 12 is made of fiber reinforced plastic (so-called FRP) containing carbon fibers and epoxy resin, and is formed by being wound around the outer circumference of the liner 11.

The caps 3A, 3B are made of metal such as stainless steel and are each provided at the center of a hemispherical end wall portion of the tank body 2. A female screw (not illustrated) is formed on the inner peripheral surface of each of openings 31a, 31b respectively provided in the caps 3A, 3B. Consequently, a functional component such as a pipe or a valve assembly 14 can be screwed into and connected to each of the caps 3A, 3B through the female screw. In FIG. 1, a two-dot chain line illustrates an example in which the valve assembly 14 is attached to only the cap 3B. For example, in the case of the tank 1 applied to the fuel cell system, the storage space 5 and an external gas flow passage (not illustrated) are connected to each other through the valve assembly 14 in which piping elements such as a valve and a joint are integrally assembled, and thus, hydrogen can be filled into the storage space 5 and can also be discharged from the storage space 5.

The liner 11 is formed in such a way that three liner portions (resin molded products) 21, 22, 23 separated in the longitudinal direction of the liner 11 are joined to each other by infrared welding or the like. That is, the end edges of the side liner portions 22, 23 having a bowl shape are respectively joined to both end edges of the center liner portion 21 having a cylindrical shape by infrared welding or the like so that the hollow liner 11 is formed. In this way, the liner 11 is formed such that the annular end edges of the resin members (the liner portions 21, 22, 23) on their open sides are butted and welded to each other.

The center liner portion 21 is formed into the cylindrical shape extending with a predetermined length along the axial direction of the liner 11.

The side liner portions 22, 23 respectively have trunk portions 22a, 23a each extending with a predetermined length along the axial direction of the liner 11. The first end side (the center liner portion 21 side) of each of the trunk portions 22a, 23a in its axial direction is open. That is, this portion serves as the end edge on the open side. The side liner portions 22, 23 respectively have bent portions 22b, 23b and communication portions 22c, 23c. The bent portions 22b, 23b are respectively formed at reduced-diameter end portions of the trunk portions 22a, 23a on their second end sides (outer sides). The communication portions 22c, 23c are respectively open at the center portions of the bent portions 22b, 23b.

The bent portions 22b, 23b respectively have the functions of ensuring the strength of the side liner portions 22, 23. The caps 3A, 3B are respectively located between the outer peripheral surfaces of the bent portions 22b, 23b and the end portions of the reinforcing portion 12.

Next, a description will be given of a plurality of embodiments of a weld bead cutting device 100 configured to remove, by cutting, a weld bead that is generated on the outer circumference of the liner 11.

First Embodiment

Weld Bead Cutting Device

Figure 2:
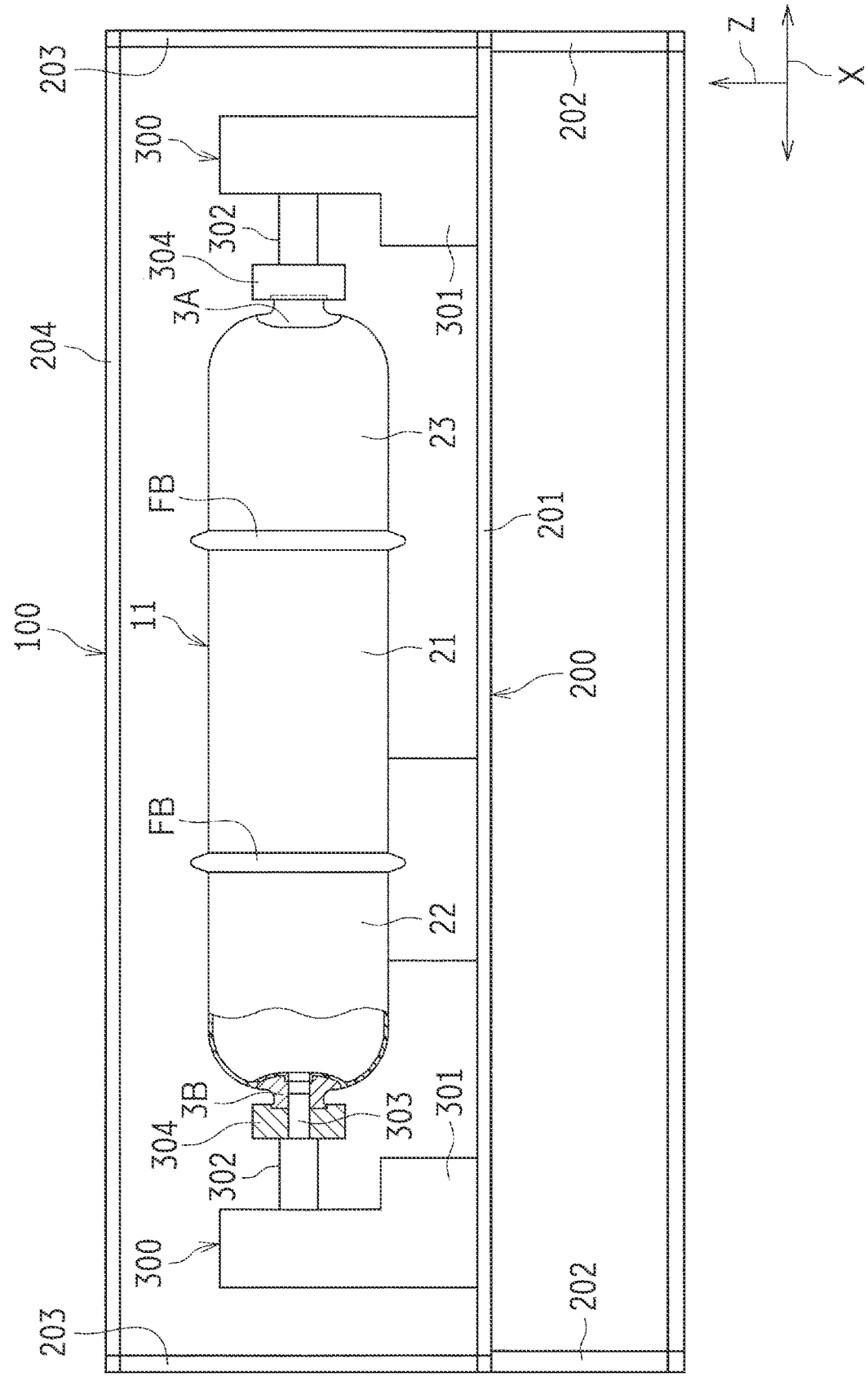
FIG. 2 is a side view illustrating a state in which a liner is set in a weld bead cutting device according to a first embodiment.
Figure 3:
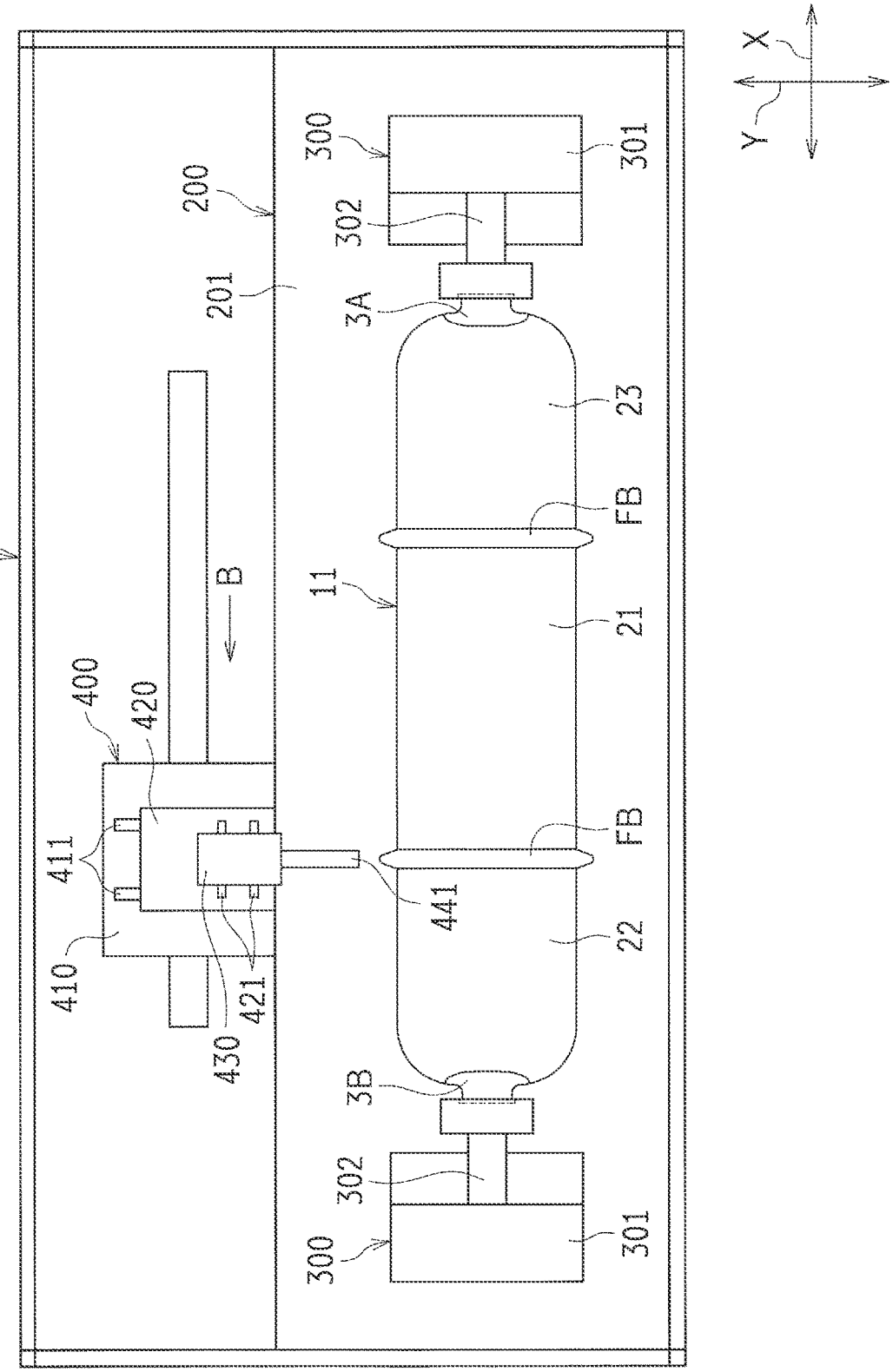
FIG. 3 is a plan view illustrating a state in which the liner is set in the weld bead cutting device according to the first embodiment.

FIG. 2 is a side view illustrating a state in which the liner 11 is set in the weld bead cutting device 100. FIG. 3 is a plan view illustrating a state in which the liner 11 is set in the weld bead cutting device 100. As illustrated in these figures, a workpiece (an intermediate molded product of the tank 1 at the stage before the reinforcing portion 12 is formed) is set in the weld bead cutting device 100. The workpiece is in a state in which the caps 3A, 3B are attached to the liner 11 formed by joining the center liner portion 21 and the side liner portions 22, 23 to each other. Hereinafter, for convenience, the intermediate molded product will also be referred to as the liner 11.

The weld bead cutting device 100 is for removing, by cutting, weld beads FB that are respectively generated on the outer circumferences of joining portions 1A, 1B (see FIG. 1) where the center liner portion 21 and the side liner portions 22, 23 are joined to each other, respectively. In the following description, the longitudinal direction of the weld bead cutting device 100 (the direction along the axial direction of the liner 11 in the state where the liner 11 is set) is defined as an X-direction, the horizontal direction perpendicular to the X-direction is defined as a Y-direction, and the vertical direction is defined as a Z-direction.

Specifically, when the center liner portion 21 and the side liner portions 22, 23 are welded to each other, a part of the resin (the resin material forming the end edges of the center liner portion 21 and the side liner portions 22, 23) melted by heating flows out toward the outer peripheral side of the liner 11 and then is cooled and cured to be the weld beads FB. There is a possibility that the weld beads FB may cause breakage of the carbon fibers or the like when winding the carbon fibers or the like around the outer circumference of the liner 11 to form the reinforcing portion 12. Further, when the weld beads FB are present, there is also a possibility that a gap may be made between the outer peripheral surface 11a of the liner 11 and the reinforcing portion 12, resulting in adversely affecting the strength of the tank 1. Therefore, it is necessary to remove the weld beads FB by cutting.

Figure 25:
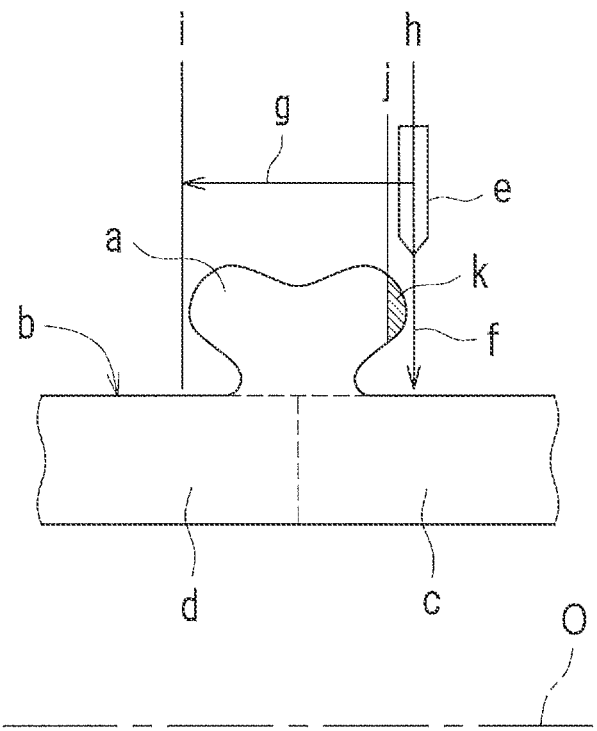
FIG. 25 is a sectional view of a part of a liner at a generation portion of a weld bead in a related art.
Figure 26:
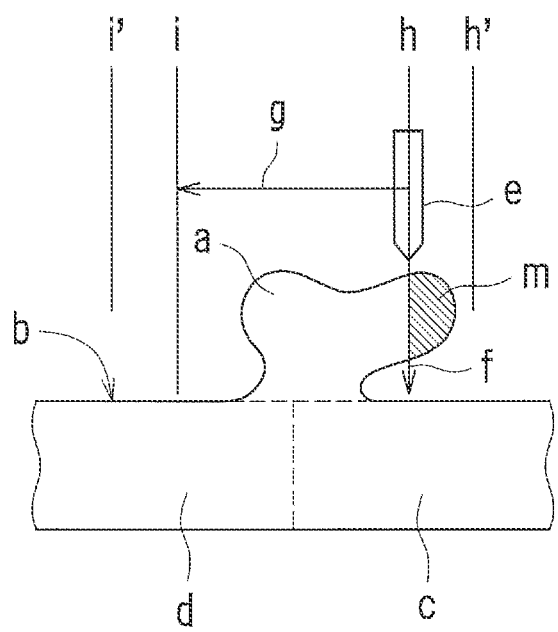
FIG. 26 is a sectional view of a part of the liner at a generation portion of a weld bead when the end edge of the weld bead on its one side is largely displaced in the related art.

As described with reference to FIG. 25, conventionally, when cutting the weld bead a, the cutting tool e is advanced toward the outer peripheral surface of the liner b while rotating the liner b about its central axis O, and the cutting tool e is moved in the width direction of the weld bead a at a predetermined feed pitch. When the sectional shape of the weld bead a is a predetermined shape, a cutting chip k having a predetermined sectional shape (a sectional shape according to the predetermined feed pitch) is sequentially generated. However, when the weld bead a has a variation in its width or in the positions of both end edges in its width direction, along the circumferential direction of the liner b, there are cases where, as illustrated in FIG. 26, the position of the cutting tool e at the start of cutting the weld bead a becomes a position closer to the center side than the position of the first end edge of the weld bead a in its width direction, and in this case, the cutting by the cutting tool e is started from this position so that the sectional area of the cutting chip m becomes large. The cutting chip m with such a large sectional area has a high rigidity and thus is not easily bent, and therefore, there is a possibility that the cutting chip m may impede the suction and recovery by getting caught in the suction port of the suction device disposed under the cutting tool e. It is possible to generate a cutting chip having a predetermined sectional shape by setting the range from the cutting start position h' to the cutting end position i' in the feed direction of the weld bead a to be large in advance. However, with this configuration, in the situation where there is no variation in the positions of the end edges of the weld bead a in its width direction, the idle distance of the cutting tool e is prolonged so that the machining time cannot be shortened.

The weld bead cutting device 100 according to this embodiment is configured to facilitate the recovery of a cutting chip by generating the cutting chip having a predetermined sectional area without causing the prolongation of the machining time. A specific description will be given below.

As illustrated in FIGS. 2 and 3, the weld bead cutting device 100 includes a base stand 200, a pair of right and left liner rotation units 300, and a cutting unit 400. Each of them will be described below.

The base stand 200 includes a base plate 201 extending in the horizontal direction, and the base plate 201 is supported by a plurality of support legs 202. The length (the dimension in the X-direction) of the base plate 201 is set to be sufficiently longer than the length of the liner 11 in the direction along its axial direction. Further, an upper frame portion 204 is disposed above the base plate 201. The upper frame portion 204 is supported by column portions 203 provided upright on the base plate 201.

The liner rotation units 300 are for supporting the liner 11 in a transverse state (a state in which the axial direction of the liner 11 is horizontal) and for rotating the liner 11 about its central axis (rotation center). That is, the liner rotation units 300 are configured to rotate the liner 11 about the central axis extending in the direction along the butting direction (the direction in which the liner portions 21, 22, 23 are butted to each other).

Specifically, each of the liner rotation units 300 includes a unit body 301 that is slidable on the base plate 201, and a rotation rod 302 protruding from the unit body 301 in the horizontal direction (the horizontal direction toward the center side of the base plate 201).

The unit body 301 is movable in the horizontal direction (the X-direction) on a rail (not illustrated) provided on the base plate 201. A power source for sliding movement of the unit body 301 is an electric motor (not illustrated). Alternatively, the power source may be another power source. The rotation rod 302 is supported to be rotatable about the horizontal axis (about the horizontal axis in the X-direction) by a bearing (not illustrated) provided inside the unit body 301. The rotation rod 302 is rotatable about the horizontal axis by receiving the power from an electric motor (not illustrated). The power source for rotating the rotation rod 302 may alternatively be another power source. Distal end portions of the rotation rods 302 serve as fitting portions 303 that are inserted and fitted into the openings 31a, 31b (see FIG. 1) provided in the caps 3A, 3B, respectively. The fitting portions 303 are respectively fitted into the openings 31a, 31b by using so-called spigot joint. Retaining members 304 are respectively attached to the distal end portions of the rotation rods 302 for retaining the caps 3A, 3B to disable the rotation of the caps 3A, 3B relative to the rotation rods 302, respectively. By the retaining members 304, the end portions (the caps 3A, 3B) of the liner 11 are retained so that the end portions of the liner 11 are prevented from rotating relative to the rotation rods 302, respectively. By the rotation of the rotation rods 302 in this retaining state, the rotational forces are transmitted to the liner 11 to rotate the liner 11 about the horizontal axis (about the horizontal axis in the X-direction). The support structure of the liner 11 by the rotation rods 302 is not limited to that described above.

Figure 4:
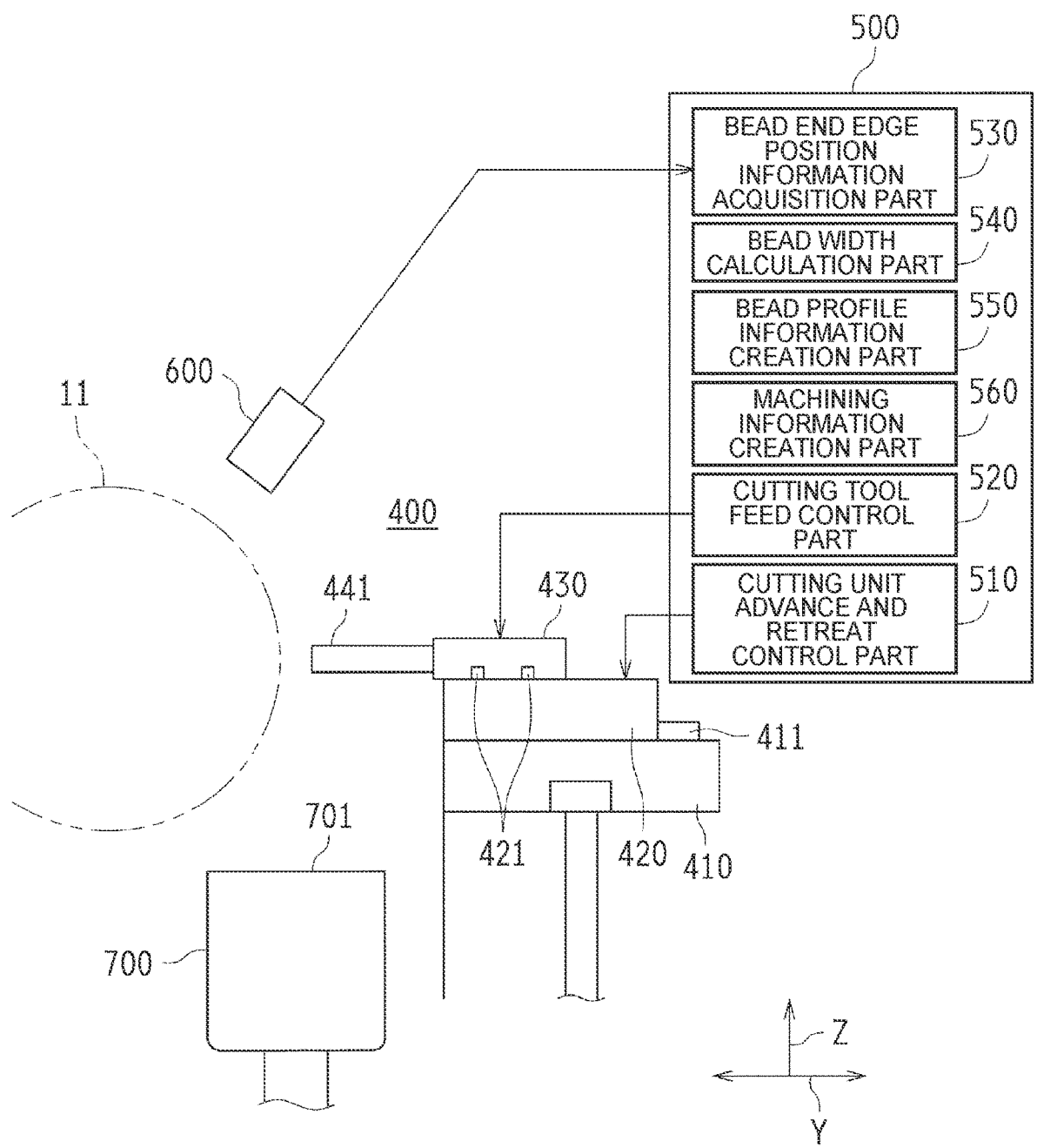
FIG. 4 is a diagram illustrating a cutting unit and its control system in the weld bead cutting device according to the first embodiment.

The cutting unit 400 is for removing the weld beads FB by cutting. FIG. 4 is a diagram illustrating the cutting unit 400 and its control system. FIG. 4 is a diagram as viewed from arrow B in FIG. 3.

As illustrated in FIGS. 3 and 4, the cutting unit 400 is configured such that a first slider 420 and a second slider 430 are supported on a unit stand 410 so that the first slider 420 and the second slider 430 are slidable relative to each other. The unit stand 410 is slidable along the X-direction.

The first slider 420 is supported by rails 411 provided on the unit stand 410 and extending along the Y-direction. The first slider 420 is slidable on the rails 411 along the Y-direction. The second slider 430 is supported by rails 421 provided on the first slider 420 and extending along the X-direction. The second slider 430 is slidable on the rails 421 along the X-direction. Power sources for sliding movements of the sliders 420, 430 are each an electric motor (not illustrated). Alternatively, the power source may be another power source.

A cutting tool 441 for cutting the weld bead FB is detachably attached to a distal end portion (a distal end portion on the liner 11 side) of the second slider 430. A well-known bit is employed as the cutting tool 441.

The cutting unit 400 is provided with a distance sensor 600 that moves integrally with the sliding movement (the sliding movement in the X-direction) of the unit stand 410. The distance sensor 600 is disposed above the cutting tool 441 and faces the outer peripheral surface of the liner 11. The distance sensor 600 is formed by an optical sensor or an ultrasonic sensor and is a non-contact sensor that measures both end positions of the weld bead FB in its width direction. For example, when the distance sensor 600 is used as a laser displacement meter, a light emitter and a light receiver are built in, and in the state where the liner 11 is rotated about the horizontal axis, laser light is sequentially irradiated from the light emitter over the entire circumference (over the phases in the rotation direction) of the weld bead FB and its peripheral portion in its circumferential direction (the circumferential direction of the liner 11), and the time from the irradiation of the laser light until the laser light is reflected by the surface of the liner 11 or the weld bead FB and received by the light receiver is measured, thereby measuring the shape of the surrounding of the weld bead FB.

Specifically, in the laser light irradiated from the distance sensor 600, the time from the irradiation until the reception by the light receiver becomes relatively long for the laser light irradiated on the surface of the liner 11 (a portion other than the generation portion of the weld bead FB), and the time from the irradiation until the reception by the light receiver becomes relatively short for the laser light irradiated on the generation portion of the weld bead FB due to the weld bead FB projecting from the surface of the liner 11. Accordingly, by measuring the time difference, it is possible to measure the shape of the weld bead FB, particularly the positions of the end edges of the weld bead FB in its width direction.

Figure 5:
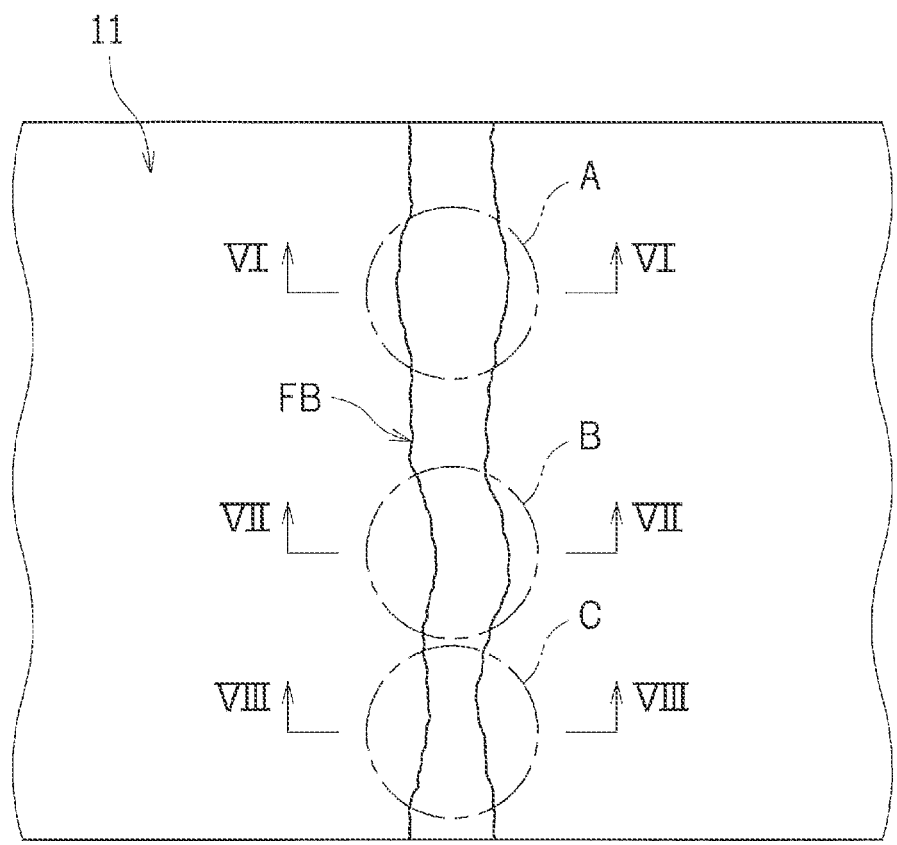
FIG. 5 is a developed view of the surrounding of a generation portion of a weld bead in the liner.
Figure 6:
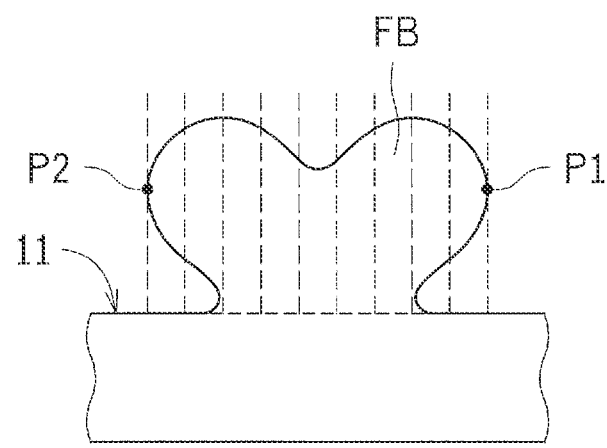
FIG. 6 is a sectional view of the weld bead and its peripheral portion taken along the line VI-VI in FIG. 5.
Figure 7:
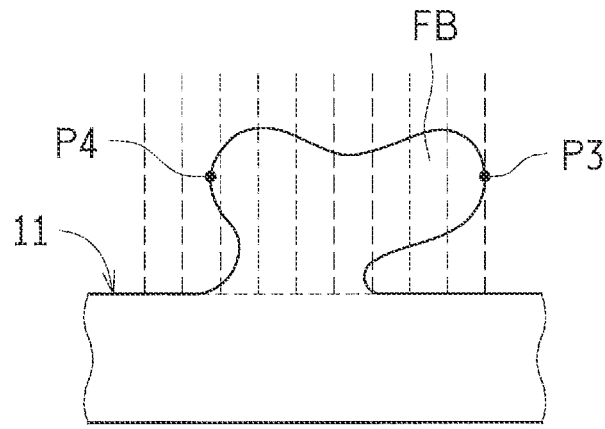
FIG. 7 is a sectional view of the weld bead and its peripheral portion taken along the line VII-VII in FIG. 5.
Figure 8:
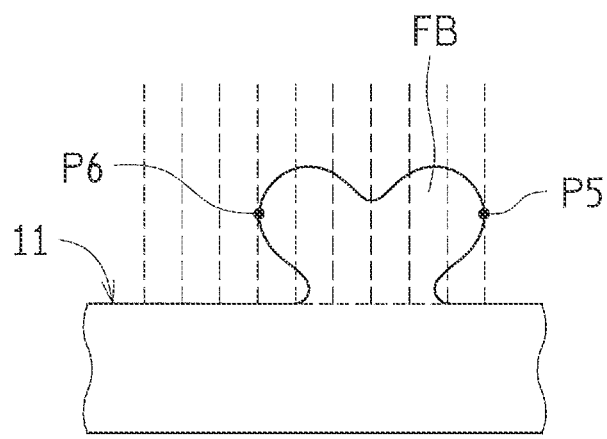
FIG. 8 is a sectional view of the weld bead and its peripheral portion taken along the line VIII-VIII in FIG. 5.

FIG. 5 is a developed view of the surrounding of the generation portion of the weld bead FB in the liner 11. FIGS. 6 to 8 illustrate sections of respective portions when the weld bead FB has a variation in its width or in the positions of both end edges in its width direction. Specifically, FIG. 6 is a sectional view of the weld bead FB and its peripheral portion taken along the line VI-VI in a region A portion in FIG. 5. In this portion, the weld bead FB is larger than an adequate shape. FIG. 7 is a sectional view of the weld bead FB and its peripheral portion taken along the line VII-VII in a region B portion in FIG. 5. In this portion, the weld bead FB has a shape displaced to the right in the figure compared to the adequate shape. FIG. 8 is a sectional view of the weld bead FB and its peripheral portion taken along the line VIII-VIII in a region C portion in FIG. 5. In this portion, the weld bead FB is smaller than the adequate shape.

According to the measurement operation of the position of the end edge of the weld bead FB in its width direction by the distance sensor 600, in the phase (the phase in the circumferential direction of the liner 11) of the section illustrated in FIG. 6, P1 in the figure is measured as a position of a first end edge (the end edge on the right side in the figure) of the weld bead FB in its width direction, and P2 in the figure is measured as a position of a second end edge (the end edge on the left side in the figure) of the weld bead FB in its width direction. In the phase of the section illustrated in FIG. 7, P3 in the figure is measured as a position of the first end edge of the weld bead FB in its width direction, and P4 in the figure is measured as a position of the second end edge of the weld bead FB in its width direction. In the phase of the section illustrated in FIG. 8, P5 in the figure is measured as a position of the first end edge of the weld bead FB in its width direction, and P6 in the figure is measured as a position of the second end edge of the weld bead FB in its width direction. In the measurement operation of the position of the end edge of the weld bead FB in its width direction by the distance sensor 600, the irradiation width of the light from the light emitter is prescribed so that the shape of the weld bead FB (the positions of the end edges of the weld bead FB in its width direction) can be measured by one rotation of the liner 11. By setting as a reference phase one of the phases in the circumferential direction of the liner 11, each of the phases and the positions of the first end edge and the second end edge of the weld bead FB in its width direction per phase are measured to be correlated with each other, and the information on the positions of the first end edge and the second end edge of the weld bead FB in its width direction per phase is output from the distance sensor 600.

As illustrated in FIG. 4, a suction device 700 is disposed under the cutting tool 441 in the cutting unit 400. The suction device 700 includes a suction port 701 that is open upward, and is configured to suck and recover a cutting chip of the weld bead FB (a cutting chip removed from the liner 11 due to cutting of a part of the weld bead FB by the cutting tool 441) by generating an air flow from the suction port 701 toward the inside of the suction device 700.

The weld bead cutting device 100 is provided with a controller 500 for controlling the sliding movements of the sliders 420, 430. Although not illustrated, the controller 500 includes a generally-known central processing unit (CPU), a read only memory (ROM), a random access memory (RAM), and so on. A control program and so on for controlling a cutting operation (a cutting process) of the weld bead FB are stored in the ROM. The CPU performs calculation processing based on the control program stored in the ROM.

The controller 500 includes a cutting unit advance and retreat control part 510 for controlling the sliding movement of the first slider 420, and a cutting tool feed control part 520 for controlling the sliding movement of the second slider 430.

The controller 500 further includes a bead end edge position information acquisition part 530, a bead width calculation part 540, a bead profile information creation part 550, and a machining information creation part 560.

When the first slider 420 is caused to slide by the control by the cutting unit advance and retreat control part 510, since the second slider 430 is placed on the first slider 420, the sliders 420, 430 slide integrally in the Y-direction.

When the second slider 430 is caused to slide by the control by the cutting tool feed control part 520, the second slider 430 slides in the X-direction (slides relative to the first slider 420). This sliding movement causes the cutting tool 441 to slide in the X-direction.

By receiving an output signal from the distance sensor 600, the bead end edge position information acquisition part 530 acquires the information on the positions of the first end edge and the second end edge of the weld bead FB in its width direction per phase. This position information is, for example, information on the distances from a reference point in the direction along the central axis of the liner 11 to the positions of both end edges of the weld bead FB in its width direction. For example, information on the distance from one of the end edges of the liner 11 in its longitudinal direction to the first end edge of the weld bead FB in its width direction, and information on the distance from the one of the end edges of the liner 11 in its longitudinal direction to the second end edge of the weld bead FB in its width direction are acquired per phase at every predetermined angle (e.g. every 1°) in the circumferential direction of the liner 11. That is, in the phase of the section illustrated in FIG. 6, the distance from the reference point (e.g. the right end edge of the liner 11 in its longitudinal direction) to P1 in the figure is acquired as information on the position of the first end edge (the end edge on the right side in the figure) of the weld bead FB in its width direction, and the distance from the reference point to P2 in the figure is acquired as information on the position of the second end edge (the end edge on the left side in the figure) of the weld bead FB in its width direction. Likewise, in the phase of the section illustrated in FIG. 7, the distance from the reference point to P3 in the figure is acquired as information on the position of the first end edge of the weld bead FB in its width direction, and the distance from the reference point to P4 in the figure is acquired as information on the position of the second end edge of the weld bead FB in its width direction. Further, in the phase of the section illustrated in FIG. 8, the distance from the reference point to P5 in the figure is acquired as information on the position of the first end edge of the weld bead FB in its width direction, and the distance from the reference point to P6 in the figure is acquired as information on the position of the second end edge of the weld bead FB in its width direction.

The bead width calculation part 540 calculates the dimension of the weld bead FB in its width direction per phase at every predetermined angle (e.g. every 1°) in the circumferential direction of the liner 11. This calculation is performed by subtracting the distance between the reference point and the first end edge of the weld bead FB in its width direction from the distance between the reference point and the second end edge of the weld bead FB in its width direction per phase. The bead width calculation part 540 also calculates the center position of the weld bead FB in its width direction per phase. This calculation is performed by calculating the average value of the distance between the reference point and the first end edge of the weld bead FB in its width direction and the distance between the reference point and the second end edge of the weld bead FB in its width direction per phase. The center position thus calculated serves as information on the center position of the movement range of the cutting tool 441 per phase in the cutting machining of the weld bead FB which will be described later.

The bead profile information creation part 550 obtains the shapes of both side edges (both side edges extending in the circumferential direction of the liner 11) of the weld bead FB by connecting, in the circumferential direction of the liner 11, the positions (the positions in the respective phases) of both end edges of the weld bead FB in its width direction acquired by the bead end edge position information acquisition part 530. A specific description will be given below with reference to FIG. 10 being an enlarged view of the weld bead FB in the region A portion in FIG. 5. In the respective phases ($\alpha 1$ to $\alpha 5$ in FIG. 10) in the circumferential direction of the liner 11, the positions of the end edge of the weld bead FB on the right side are points a1, b1, c1, d1, e1 in the figure. The shape (the bead profile) of the end edge of the weld bead FB on the right side is obtained by connecting these points in the circumferential direction of the liner 11. Likewise, in the respective phases in the circumferential direction of the liner 11, the positions of the end edge of the weld bead FB on the left side are points a2, b2, c2, d2, e2 in the figure. The shape (the bead profile) of the end edge of the weld bead FB on the left side is obtained by connecting these points in the circumferential direction of the liner 11.

When obtaining the bead profile, it is preferable that the points a1, b1, c1, d1, e1 (a2, b2, c2, d2, e2) in the respective phases be connected to each other in the circumferential direction of the liner 11 by a smooth curved line. That is, with respect to the points a1, b1, c1, d1, e1 (a2, b2, c2, d2, e2), the adjacent points present on both sides (both sides in the circumferential direction of the liner 11) are interpolated so that it is possible to calculate positions that connect between these points by a smooth curved line.

According to the bead profile information on the end edges of the weld bead FB created by the bead profile information creation part 550, the machining information creation part 560 creates position information of the cutting tool 441 in its feed direction (the direction along the width direction of the weld bead FB) for use when cutting the weld bead FB by the cutting tool 441.

Specifically, using the bead profile information on one of the sides (e.g. on the right side) out of the bead profile information on both end edges of the weld bead FB, information defining the position of the cutting tool 441 in its feed direction per phase is created so as to obtain a cutting locus (a moving locus) that approximates (approximately coincides with) the shape of the end edge of the weld bead FB along the circumferential direction of the liner 11 being this bead profile information. This information is also created as information defining the position of the cutting tool 441 in its feed direction (the position of the cutting tool 441 in its feed direction per rotation of the liner 11) per phase so that even in the state where the cutting tool 441 is moved in the width direction by a predetermined feed pitch per rotation of the rotating liner 11, the cutting locus (the cutting locus that approximately coincides with the shape of the end edge of the weld bead FB along the circumferential direction of the liner 11) is obtained.

This information creation operation corresponds to an operation of "creating, based on the bead profile information created by the bead profile information creation part, machining information of the workpiece per rotation of the workpiece being position information of the cutting tool in the bead width direction per phase in the circumferential direction of the workpiece so that a moving locus of the cutting tool relative to the workpiece along the circumferential direction of the workpiece approximates the shape of the end edge of the weld bead over the entire circumference of the workpiece in the circumferential direction per rotation of the workpiece rotating about the central axis" referred to in the disclosure.

The feed pitch set herein is set in advance by experiments or simulations as a value that enables the generation of a cutting chip having a predetermined sectional shape (a sectional shape that prevents a too high rigidity). That is, since the width of a cutting chip becomes a width corresponding to the feed pitch of the cutting tool 441 per rotation of the rotating liner 11 (a dimension equal to or less than the dimension of the feed pitch), the generation of a cutting chip having a predetermined sectional shape (a sectional shape that prevents a too high rigidity) is enabled by properly setting the feed pitch. In this embodiment, the feed pitch is set to a constant value from the cutting start to the cutting end of the weld bead FB (a constant value in all the phases). For example, the feed pitch is set to 0.1 mm. The feed pitch is not limited to this value. Taking into account the hardness of the liner 11 and so on, the feed pitch is set to a value that causes a cutting chip to have a rigidity that enables the suction and recovery of the cutting chip without getting caught in the suction port 701 of the suction device 700.

Figure 10:
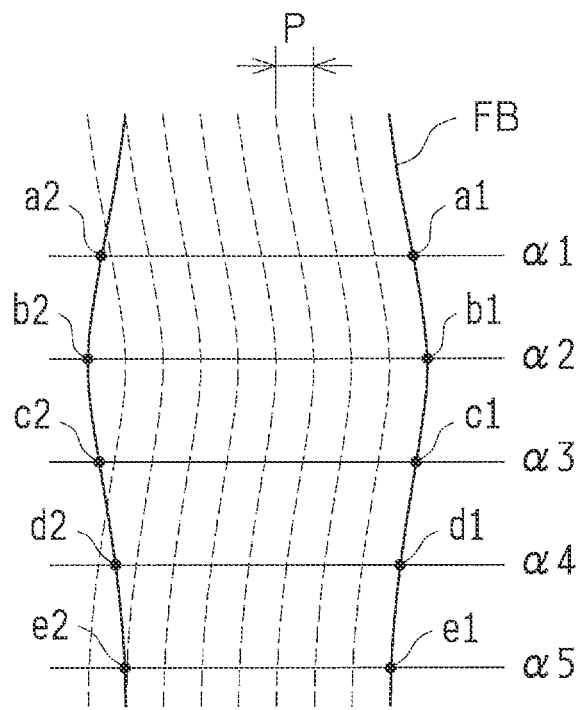
FIG. 10 is a diagram for explaining relative moving loci of a cutting tool in a region A portion in FIG. 5 in the first embodiment.

In FIG. 10, broken lines each indicate the cutting locus per rotation of the liner 11. That is, the broken lines each indicate the relative moving locus (relative to the liner 11) of the cutting tool 441 per rotation in the region A portion in FIG. 5. Broken lines in FIG. 6 also each indicate a cutting region by the cutting tool 441 per rotation in the region A portion. In the actual cutting process, the cutting tool 441 is moved by the feed pitch per rotation from the moving locus of the broken line on the right side in the figure to the moving locus of the broken line on the left side in sequence. These figures illustrate a case where the cutting tool 441 completes the cutting of the weld bead FB by about eight rotations (eight times of rotation) of the liner 11. However, actually, this number of times of rotation is determined according to the setting of the feed pitch. The machining information creation part 560 creates as the position information the positions of the cutting tool 441 per rotation for the respective phases (the respective phases $\alpha 1$, $\alpha 2$, $\alpha 3$, $\alpha 4$, $\alpha 5$ in FIG. 10) so that the cutting tool 441 moves along the moving loci described above. That is, intersection points between straight lines indicating the phases $\alpha 1$, $\alpha 2$, $\alpha 3$, $\alpha 4$, $\alpha 5$ and the broken lines each indicating the moving locus of the cutting tool 441 per rotation in FIG. 10 are created as the position information. The moving locus of the cutting tool 441 in the final rotation of the liner 11 is set so that the sectional area (particularly the width) of a cutting chip generated by the cutting tool 441 moved along this moving locus becomes equal to or less than the feed pitch. In FIG. 10, a dimension P is the feed pitch per rotation of the liner 11 (this also applies to FIGS. 11 and 12).

Figure 11:
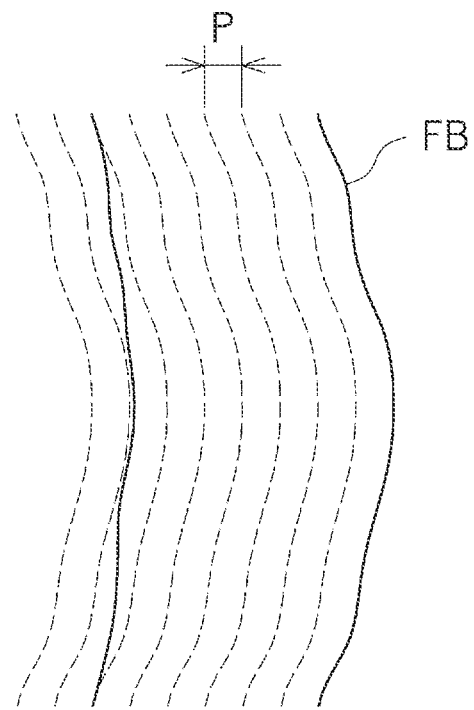
FIG. 11 is a diagram for explaining relative moving loci of the cutting tool in a region B portion in FIG. 5 in the first embodiment.

Likewise, broken lines in FIG. 11 each indicate the cutting locus per rotation of the liner 11 in the region B portion in FIG. 5. That is, the broken lines each indicate the relative moving locus of the cutting tool 441 per rotation in the region B portion in FIG. 5. Broken lines in FIG. 7 also each indicate a cutting region by the cutting tool 441 per rotation in the region B portion.

Figure 12:
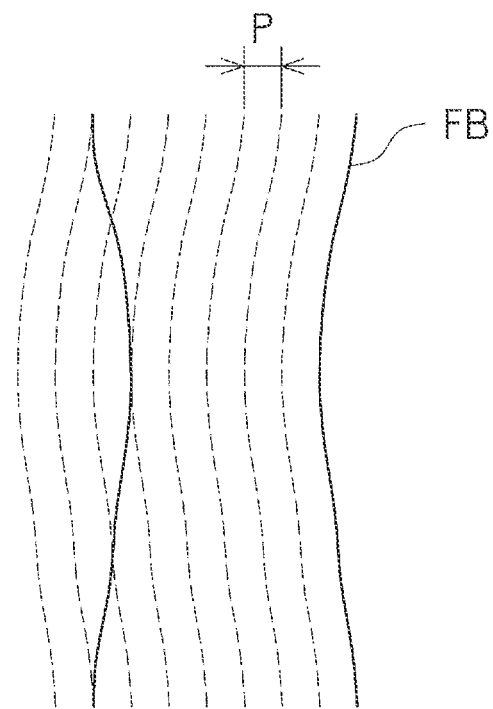
FIG. 12 is a diagram for explaining relative moving loci of the cutting tool in a region C portion in FIG. 5 in the first embodiment.

Likewise, broken lines in FIG. 12 each indicate the cutting locus per rotation of the liner 11 in the region C portion in FIG. 5. That is, the broken lines each indicate the relative moving locus of the cutting tool 441 per rotation in the region C portion in FIG. 5. Broken lines in FIG. 8 also each indicate a cutting region by the cutting tool 441 per rotation in the region C portion.

As seen from these figures, the relative moving locus of the cutting tool 441 per rotation of the liner 11 is created as information such that it is the cutting locus that approximately coincides with the shape of the end edge of the weld bead FB on the right side, and is moved in the feed direction at the constant feed pitch P.

Then, the information for moving the cutting tool 441 along such moving loci is transmitted to the cutting tool feed control part 520 at the time of the cutting machining of the weld bead FB, and is used as information for the cutting tool feed control part 520 to control the sliding movement position of the second slider 430.

Weld Bead Cutting Operation

Next, the cutting operation of the weld bead FB performed by the weld bead cutting device 100 will be described.

Figure 9:
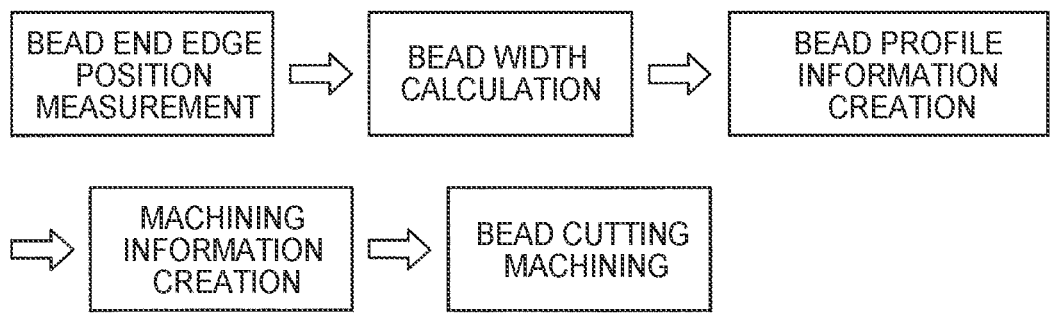
FIG. 9 is a diagram illustrating the sequence of a weld bead cutting process in the first embodiment.

As illustrated in FIG. 9 (a diagram illustrating the sequence of the weld bead cutting process), processes of "bead end edge position measurement", "bead width calculation", "bead profile information creation", "machining information creation", and "bead cutting machining" are performed in this order in the cutting operation of the weld bead FB. A specific description will be given below.

As illustrated in FIGS. 2 and 3, the cutting operation of the weld bead FB is performed in the state where the liner 11 is set in the weld bead cutting device 100. That is, the cutting operation of the weld bead FB is performed in the state where the workpiece (the intermediate molded product of the tank 1 at the stage before the reinforcing portion 12 is formed) is set in the weld bead cutting device 100. The workpiece is in a state in which the caps 3A, 3B are attached to the liner 11 formed by joining (welding) the center liner portion 21 and the side liner portions 22, 23 to each other in the separate process (the production process of the liner 11).

When setting the liner (the workpiece) 11 in the weld bead cutting device 100, first, the unit bodies 301 of the liner rotation units 300 are moved in the horizontal direction (the X-direction) on the rail (not illustrated) provided on the base plate 201 so that the unit bodies 301 are spaced apart from each other by a predetermined distance (a distance longer than the length of the liner 11 in the direction along the axial direction). Then, in the state where the liner 11 is temporarily held above the base plate 201, the liner rotation units 300 are advanced toward each other, and the fitting portions 303 respectively provided at the distal end portions of the rotation rods 302 are respectively inserted and fitted into the openings 31a, 31b provided in the caps 3A, 3B, respectively. Further, the caps 3A, 3B are retained by the retaining members 304 respectively attached to the distal end portions of the rotation rods 302 so that the rotation of the caps 3A, 3B relative to the rotation rods 302 is disabled, respectively. Consequently, when the rotation rods 302 are rotated, the rotational forces are transmitted to the liner 11 to enable the rotation of the liner 11 about the horizontal axis (about the horizontal axis in the X-direction).

In the state where the liner 11 is set in the weld bead cutting device 100 as described above, as illustrated in FIG. 4, the cutting unit 400 is at a retreat position (a retreat position with a predetermined distance from the liner 11), and the cutting tool 441 is at a position with a predetermined distance from the liner 11.

After the liner 11 is set in the weld bead cutting device 100 as described above, the electric motors of the liner rotation units 300 are operated, and the cutting operation of the weld bead FB is performed in the state where the liner 11 is rotated about the horizontal axis (about the horizontal axis in the X-direction).

In the cutting operation of the weld bead FB, first, the bead end edge position measurement is performed. In the bead end edge position measurement, in the state where the liner 11 is rotated about the horizontal axis, laser light is sequentially irradiated from the light emitter of the distance sensor 600 over the entire circumference (over the phases in the rotation direction) of the weld bead FB and its peripheral portion in its circumferential direction (the circumferential direction of the liner 11), and the time from the irradiation of the laser light until the laser light is reflected by the surface of the liner 11 or the weld bead FB and received by the light receiver is measured, thereby measuring the shape of the surrounding of the weld bead FB. Then, information on the positions of the first end edge and the second end edge of the weld bead FB in its width direction per phase in the circumferential direction of the liner 11 is transmitted from the distance sensor 600 to the bead end edge position information acquisition part 530. By receiving an output signal from the distance sensor 600, the bead end edge position information acquisition part 530 acquires the information on the positions of the first end edge and the second end edge of the weld bead FB in its width direction per phase. That is, information on the distance from one of the end edges of the liner 11 in its longitudinal direction to the first end edge of the weld bead FB in its width direction, and information on the distance from the one of the end edges of the liner 11 in its longitudinal direction to the second end edge of the weld bead FB in its width direction are acquired per phase at every predetermined angle (e.g. every 1°) in the circumferential direction of the liner 11.

In the bead width calculation process, the bead width calculation part 540 calculates the dimension of the weld bead FB in its width direction per phase at every predetermined angle (e.g. every 1°) in the circumferential direction of the liner 11. That is, this calculation is performed by subtracting the distance between the reference point and the first end edge of the weld bead FB in its width direction from the distance between the reference point and the second end edge of the weld bead FB in its width direction per phase.

In the bead profile information creation process (a bead profile information creation step referred to in the disclosure), the bead profile information creation part 550 obtains the shapes of both side edges (both side edges extending in the circumferential direction of the liner 11) of the weld bead FB by connecting, in the circumferential direction of the liner 11, the positions (the positions in the respective phases) of both end edges of the weld bead FB in its width direction acquired by the bead end edge position information acquisition part 530.

In the machining information creation process (a machining information creation step referred to in the disclosure), according to the bead profile information on the end edges of the weld bead FB created by the bead profile information creation part 550, the machining information creation part 560 creates position information of the cutting tool 441 in its feed direction (the direction along the width direction of the weld bead FB) for use when cutting the weld bead FB by the cutting tool 441. That is, using the bead profile information on one of the sides (e.g. on the right side) out of the bead profile information on both end edges of the weld bead FB, information defining the position of the cutting tool 441 in its feed direction per phase is created so as to obtain a cutting locus that approximately coincides with the shape of the end edge of the weld bead FB along the circumferential direction of the liner 11 being this bead profile information. Further, information defining the position of the cutting tool 441 in its feed direction (the position of the cutting tool 441 in its feed direction per rotation of the liner 11) per phase is created so that even in the state where the cutting tool 441 is moved in the width direction by a predetermined feed pitch per rotation of the rotating liner 11, the cutting locus (the cutting locus that approximately coincides with the shape of the end edge of the weld bead FB along the circumferential direction of the liner 11) is obtained.

In the bead cutting machining, the cutting operation of the weld bead FB is actually performed. First, the first slider 420 is caused to slide in the direction (the Y-direction) toward the liner 11 by the control by the cutting unit advance and retreat control part 510. Consequently, the sliders 420, 430 slide integrally in the direction toward the liner 11. In this event, the position of the cutting tool 441 in the bead width direction is a position where the cutting tool 441 is not in contact with the weld bead FB.

By the sliding movement of the first slider 420 by the control by the cutting unit advance and retreat control part 510, the cutting tool 441 slides in the Y-direction (slides in the direction toward the weld bead FB). For example, the tip of the cutting tool 441 is maintained at a position retreated from the outer peripheral surface of the liner 11 by about 2 mm.

In this state, the cutting tool feed control part 520 receives the machining information created by the machining information creation part 560, and the cutting tool feed control part 520 moves the cutting tool 441 along the moving loci according to the machining information. That is, as indicated by the broken lines in FIGS. 10, 11, and 12, the position of the cutting tool 441 in its feed direction is controlled per rotation of the liner 11 along the cutting locus that approximately coincides with the shape of the end edge of the weld bead FB along the circumferential direction of the liner 11 so that the control of the position of the cutting tool 441 in its feed direction along the cutting locus is performed per rotation. That is, by causing the second slider 430 to slide in the X-direction (to slide at a predetermined feed pitch per rotation), the weld bead FB is cut while generating a cutting chip with an approximately constant width (while being cut in a manner of so-called katsuramuki (rotary peeling)) (a cutting tool feed control step referred to in the disclosure).

In this embodiment, the weld bead FB is almost removed, for example, by performing twice the cutting process (the cutting process achieved by moving the cutting tool 441 in the X-direction) of the weld bead FB. That is, in the first cutting process, as described above, the cutting is performed by moving the cutting tool 441 in the X-direction in the state where the tip of the cutting tool 441 is maintained at the position retreated from the outer peripheral surface of the liner 11 by about 2 mm. Then, in the second cutting process, the cutting is performed by moving the cutting tool 441 in the X-direction in the state where the tip of the cutting tool 441 is maintained at a position almost in contact with the outer peripheral surface of the liner 11. The cutting loci of the cutting tool 441 in the second cutting process are the same as the cutting loci of the cutting tool 441 in the first cutting process (see the broken lines in FIGS. 10, 11, and 12). The weld bead FB is almost removed by performing the first and second cutting processes. Also in the second cutting process, the respective processes (see FIG. 9) may be performed in order from the bead end edge position measurement process like in the first cutting process described above.

It may be configured that the weld bead FB is almost removed by performing the cutting process once, or by performing the cutting process three times or more. That is, this embodiment is the case where the weld bead FB is almost removed without the need for cutting of the weld bead FB by the advance and retreat movements (the movements in the Y-direction) of the cutting tool 441 (cutting for eliminating the level difference of the liner outer peripheral surface, due to the weld bead FB, by the movements of the cutting tool 441 in the Y-direction) which will be described in a later-described third embodiment. In particular, the cutting process in this embodiment can be realized in the case where the section (the section in the direction perpendicular to the central axis) of the liner 11 is almost a perfect circle.

Effects of the Embodiment

As described above, in this embodiment, the machining information of the liner 11 per rotation of the liner 11 being the position information of the cutting tool 441 in the bead width direction per phase in the circumferential direction of the liner 11 is created based on the created bead profile information so that the moving locus of the cutting tool 441 relative to the liner 11 approximates the shape of the end edge of the weld bead FB per rotation of the liner 11. According to this machining information, the position of the cutting tool 441 in the bead width direction per rotation of the liner 11 is controlled. Therefore, the shape of a cutting chip generated by the cutting can be adjusted as desired (the shape of a cutting chip can be adjusted to be equal to or less than the feed pitch according to the setting of the feed pitch) so that it is possible to generate a cutting chip having a predetermined sectional shape (a sectional shape that prevents a too high rigidity). As a result, it is possible to generate a cutting chip that can be easily sucked and recovered by the suction device 700.

Second Embodiment

Next, a second embodiment will be described. In the first embodiment described above, the feed pitch (the dimension P in FIGS. 10 to 12) of the cutting tool 441 per rotation of the rotating liner 11 is constant. In this embodiment, the feed pitch of the cutting tool 441 per rotation of the rotating liner 11 is changed per phase according to the dimension of the weld bead FB in its width direction. Specifically, as the dimension of the weld bead FB in its width direction becomes smaller (for the phase with a smaller dimension of the weld bead FB in its width direction), the feed pitch of the cutting tool 441 per rotation of the liner 11 is set to be smaller. In other words, as the dimension of the weld bead FB in its width direction becomes greater, the feed pitch of the cutting tool 441 per rotation of the liner 11 is set to be greater. More specifically, the feed pitch of the cutting tool 441 is changed per phase so that the moving locus (the cutting locus) of the cutting tool 441 does not deviate from the weld bead FB, i.e. the cutting tool 441 continues to be in contact with the weld bead FB (continues to cut the weld bead FB) from the start to the end of the cutting machining.

Therefore, in this embodiment, based on information on the positions of both end edges of the weld bead FB in the bead width direction over the entire circumference of the liner 11 in its circumferential direction measured by the distance sensor 600, the bead profile information creation part 550 creates bead profile information as information on the shapes of both end edges of the weld bead FB over the entire circumference of the liner 11 in its circumferential direction.

Further, the machining information creation part 560 creates machining information in which the feed pitch of the cutting tool 441 per phase in the circumferential direction of the liner 11 is changed so that the position of the cutting tool 441 in the bead width direction per phase in the circumferential direction of the liner 11 from the cutting start position to the cutting end position in the bead width direction is located closer to the center side of the weld bead FB than the positions of both end edges of the weld bead FB per rotation of the liner 11.

This information creation operation corresponds to an operation of "creating machining information in which the feed pitch of the cutting tool per phase in the circumferential direction of the workpiece is changed so that the position of the cutting tool in the bead width direction per phase in the circumferential direction of the workpiece from a cutting start position to a cutting end position in the bead width direction is located closer to a center side of the weld bead than the positions of both end edges of the weld bead per rotation of the workpiece" referred to in the disclosure.

Figure 13:
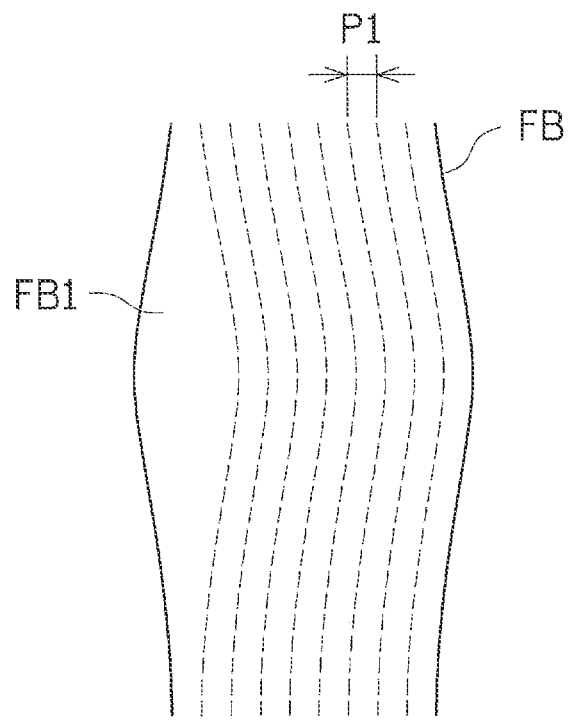
FIG. 13 is a diagram for explaining relative moving loci of the cutting tool in the region A portion in FIG. 5 in a second embodiment.
Figure 14:
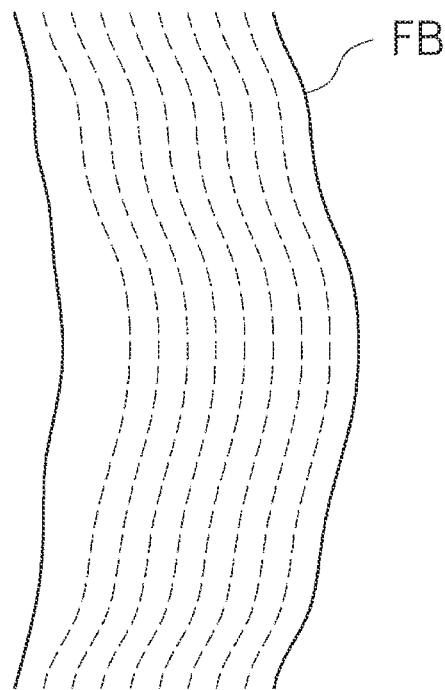
FIG. 14 is a diagram for explaining relative moving loci of the cutting tool in the region B portion in FIG. 5 in the second embodiment.

FIG. 13 illustrates the region A portion in FIG. 5, and broken lines in FIG. 13 indicate moving loci of the cutting tool 441 in this embodiment. Likewise, FIG. 14 illustrates the region B portion in FIG. 5, and broken lines in FIG. 14 also indicate moving loci of the cutting tool 441 in this embodiment. Likewise, FIG. 15 illustrates the region C portion in FIG. 5, and broken lines in FIG. 15 also indicate moving loci of the cutting tool 441 in this embodiment.

In this embodiment, in order to obtain such moving loci, using the bead profile information on both end edges of the weld bead FB, the machining information creation part 560 creates information defining the position of the cutting tool 441 in its feed direction per phase so as to obtain a cutting locus that approximately coincides with the shape of the end edge (the end edge on the right side) of the weld bead FB along the circumferential direction of the liner 11 being the bead profile information. Further, the machining information creation part 560 creates information defining the position of the cutting tool 441 in its feed direction, that adjusts the feed pitch per phase so that the moving locus of the cutting tool 441 in the final rotation of the liner 11 does not straddle the end edge (the end edge on the left side) of the weld bead FB along the circumferential direction of the liner 11 being the bead profile information.

Figure 15:
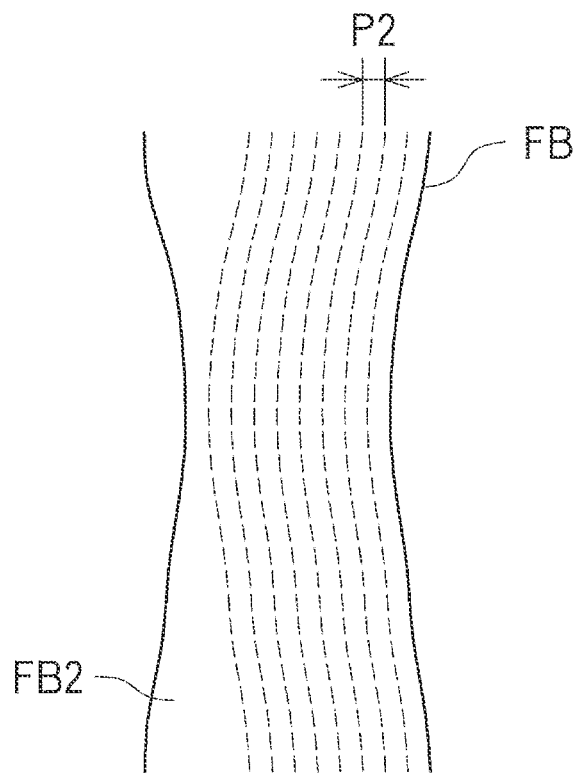
FIG. 15 is a diagram for explaining relative moving loci of the cutting tool in the region C portion in FIG. 5 in the second embodiment.

Therefore, as illustrated in FIGS. 13 to 15, in the region where the dimension of the weld bead FB in its width direction is relatively large (e.g. the region A portion in FIG. 5), the feed pitch of the cutting tool 441 is also set to be relatively large (see a feed pitch P1 in FIG. 13). For the feed pitch in this case, an upper limit (e.g. 0.2 mm) is set in advance as a range in which the rigidity of a cutting chip does not become too high. On the other hand, in the region where the dimension of the weld bead FB in its width direction is relatively small (e.g. the region C portion in FIG. 5), the feed pitch of the cutting tool 441 is also set to be relatively small (see a feed pitch P2 in FIG. 15).

By changing the feed pitch of the cutting tool 441 according to the dimension of the weld bead FB in its width direction per phase in this way, the moving locus of the cutting tool 441 does not deviate from the weld bead FB so that a cutting chip generated by cutting per phase becomes continuous without being broken off from the start to the end of the cutting machining. That is, the cutting chip is removed from the liner 11 as a single cutting chip. Therefore, when the suction and recovery of a cutting chip, generated at the start of the cutting machining, into the suction port 701 of the suction device 700 is started, a cutting chip generated (continuously generated) thereafter is pulled into the suction port 701 by the cutting chip sucked and recovered earlier. Consequently, all the cutting chip (the single continuous cutting chip) is sucked and recovered into the suction port 701 of the suction device 700 well. Then, at the end of the final rotation, all the weld bead FB is removed from the liner 11.

Since the other configuration and cutting operation are the same as in the case of the first embodiment described above, a description thereof is omitted herein.

According to this embodiment, even when the sectional area of a cutting chip becomes extremely large or extremely small, since the cutting chip becomes continuous without being broken off from the start to the end of the cutting machining, the cutting chip is sucked and recovered into the suction port 701 of the suction device 700 well.

That is, even in the situation where a cutting chip with a large sectional area and thus with a high rigidity is generated (e.g. see a cutting chip FB1 in FIG. 13 and a cutting chip FB2 in FIG. 15), the cutting chip can be sucked and recovered into the suction port 701 of the suction device 700 well.

When a cutting chip with an extremely small sectional area is broken off, curling occurs in a cutting chip at this portion. In this case, there is a possibility that the generation direction of the cutting chip (the direction in which the cutting chip extends due to the curling) may become different from the direction toward the suction port 701 of the suction device 700 to impede the suction and recovery by the suction device 700. Further, since the cutting chip is slightly electrified, if the cutting chip with the extremely small sectional area is broken off, there is also a possibility that the electrified cutting chip may be adhered (electrically adhered) to the liner 11, and also in this case, there is a possibility of impeding the suction and recovery by the suction device 700. According to this embodiment, since the cutting chip becomes continuous without being broken off from the start to the end of the cutting machining as described above, even when the sectional area of the cutting chip becomes extremely small, the cutting chip can be sucked and recovered into the suction port 701 of the suction device 700 well.

In this embodiment, in order to avoid that the sectional area of the cutting chip becomes extremely large or extremely small, the number of rotations (the number of times of rotation) of the liner 11 from the cutting start to the cutting end of the weld bead FB may be set to be variable. That is, when it is conjectured that the sectional area of the cutting chip becomes extremely large, the number of rotations of the liner 11 from the cutting start to the cutting end of the weld bead FB is increased. That is, the feed pitch is changed to be smaller. Conversely, when it is conjectured that the sectional area of the cutting chip becomes extremely small, the number of rotations of the liner 11 from the cutting start to the cutting end of the weld bead FB is reduced. That is, the feed pitch is changed to be greater.

Third Embodiment

Next, a third embodiment will be described. In the first and second embodiments described above, the description has been given only of the case where the weld bead FB is cut while moving (feeding) the cutting tool 441 along the width direction of the weld bead FB. In this embodiment, in addition to this cutting, there is provided a process of cutting the weld bead FB by moving the cutting tool 441 along the height direction of the weld bead FB (the radial direction of the liner 11; the Y-direction). That is, after the cutting machining in which the weld bead FB is cut while moving the cutting tool 441 along the width direction of the weld bead FB (hereinafter referred to as the rough machining) is performed, the cutting machining in which the weld bead FB remaining after the rough machining is cut by moving the cutting tool 441 along the height direction of the weld bead FB to remove the remaining weld bead FB almost completely so that the outer peripheral surface of the liner 11 has a smooth curved surface by preventing the weld bead FB from remaining on the outer peripheral surface of the liner 11 (hereinafter referred to as the finish machining) is performed.

Figure 16:
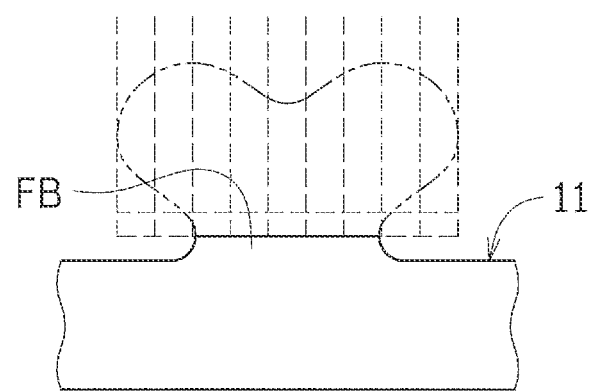
FIG. 16 is a sectional view of a part of a liner at the time when the rough machining is finished in a third embodiment.

FIG. 16 is a sectional view of the weld bead FB and its peripheral portion after the cutting machining (the rough machining) according to the first embodiment or the second embodiment described above is performed. In FIG. 16, broken lines each indicate a cutting region by the cutting tool 441 per rotation in the rough machining. As illustrated in FIG. 16, the weld bead FB slightly remains after the rough machining, and the remaining weld bead FB is cut by the finish machining.

In general, when the section (the section in the direction perpendicular to the central axis) of the liner is a perfect circle and the center position of the section coincides with the rotation centers of the rotation rods 302, the distance between the rotation center of the liner and the outer peripheral surface of the liner is uniform over the entire circumference of the liner. Therefore, it is possible to cut the weld bead FB well over its entirety in the circumferential direction by simply rotating the liner 11 while the cutting tool 441 is fixed at a position in contact with the root of the weld bead FB (a position where the entire weld bead FB can be cut).

However, there are cases where the section of the actual liner 11 is not a perfect circle (e.g. the section is an elliptical shape) due to the influence of a machining error or centrifugal force caused by rotation. Even when the section of the liner is a perfect circle, there are cases where the distance between the rotation center and the outer peripheral surface of the liner 11 becomes non-uniform over the entire circumference of the liner 11 due to the influence of the centrifugal force.

Therefore, in the situation where the cutting tool 441 faces a region where the distance between the rotation center and the outer peripheral surface of the liner 11 is short, there is a possibility that the cutting tool 441 may not reach the root of the weld bead FB. That is, there is a possibility that the weld bead FB may be partially left uncut. On the other hand, in the situation where the cutting tool 441 faces a region where the distance between the rotation center and the outer peripheral surface of the liner 11 is long, there is a possibility that the cutting tool 441 may reach not only the weld bead FB but also the outer peripheral surface of the liner 11 to cut the outer peripheral surface of the liner 11. That is, there is a possibility that the liner 11 may be partially thinned or perforated.

In this embodiment, even when the section of the liner 11 is not a perfect circle, or the distance between the rotation center and the outer peripheral surface 11a of the liner 11 is non-uniform over the entire circumference of the liner 11 (the distance is non-uniform even when the section of the liner 11 is a perfect circle), it is possible to cut the weld bead FB well with high accuracy over its entirety in the circumferential direction by the finish machining.

Figure 17:
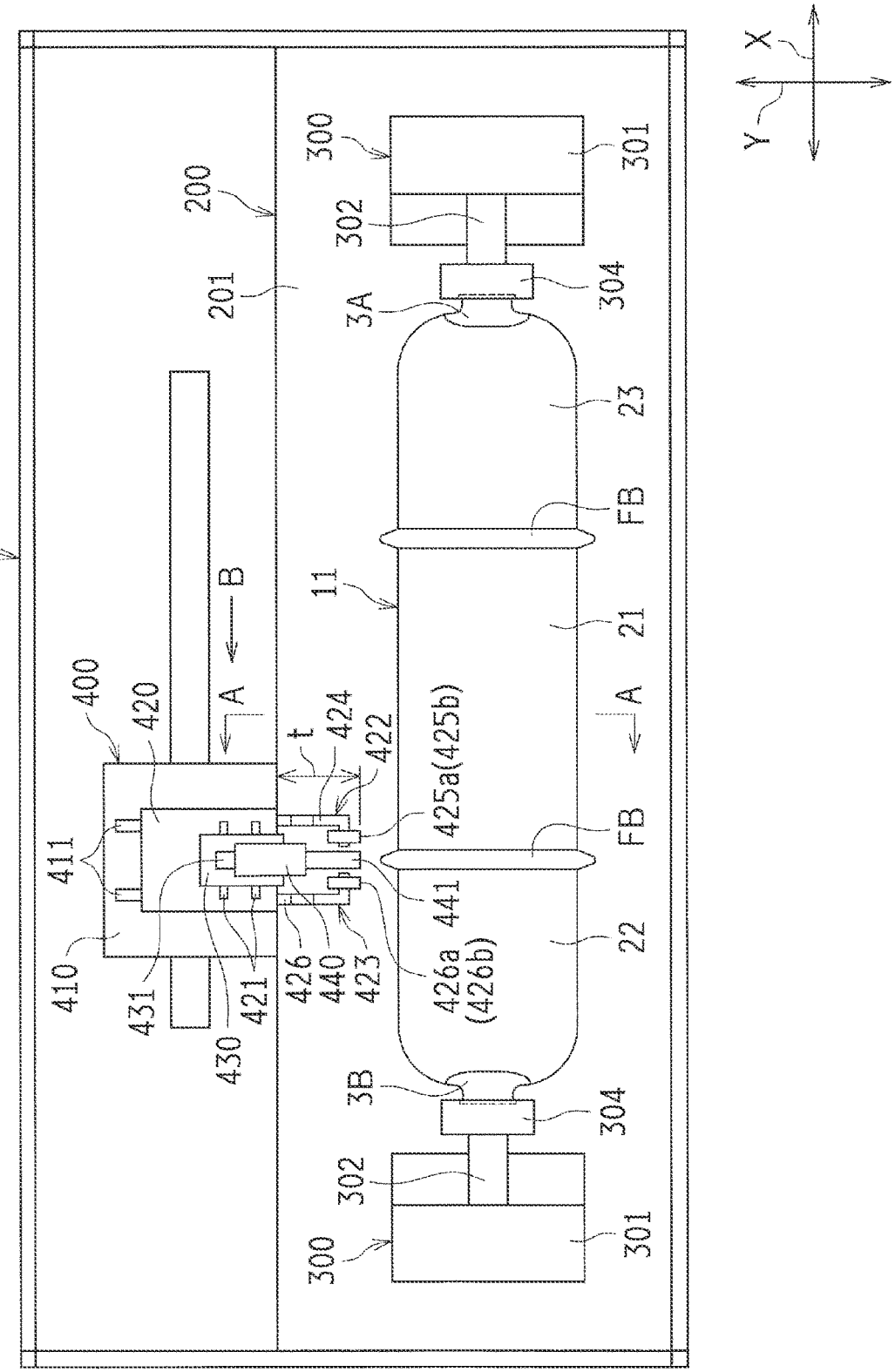
FIG. 17 is a plan view illustrating a state in which the liner is set in a weld bead cutting device according to the third embodiment.
Figure 18:
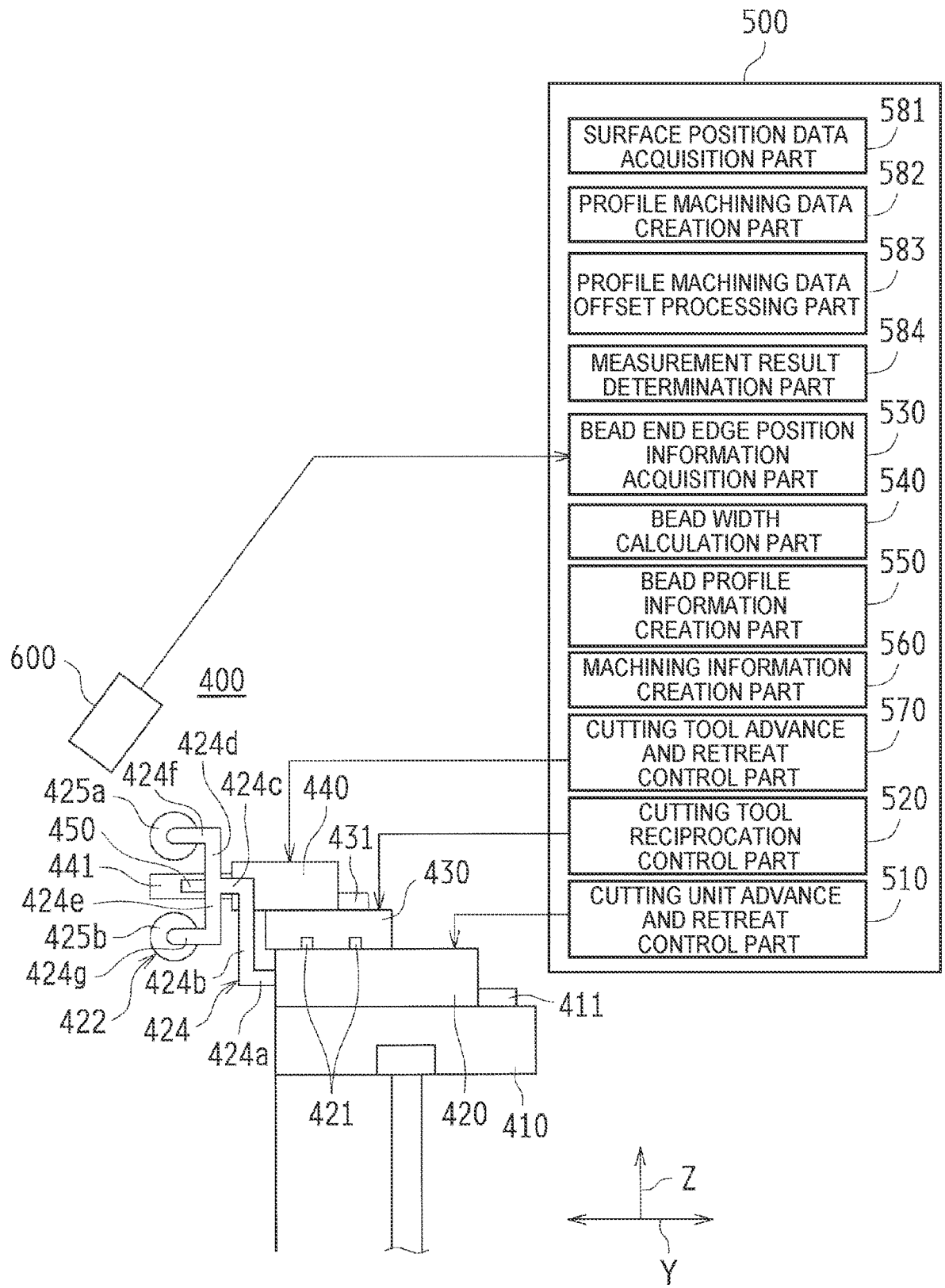
FIG. 18 is a diagram illustrating a cutting unit and its control system in the weld bead cutting device according to the third embodiment.

In this embodiment, points that differ from the first embodiment described above will be described. FIG. 17 is a plan view illustrating a state in which the liner 11 is set in the weld bead cutting device 100 according to this embodiment. FIG. 18 is a diagram illustrating the cutting unit 400 and its control system in the weld bead cutting device 100 according to this embodiment. FIG. 18 is a diagram as viewed from arrow B in FIG. 17.

As illustrated in FIGS. 17 and 18, the cutting unit 400 of the weld bead cutting device 100 according to this embodiment includes a third slider 440 in addition to the first slider 420 and the second slider 430. The third slider 440 is supported by a rail 431 provided on the second slider 430 and extending along the Y-direction. The third slider 440 is slidable on the rail 431 along the Y-direction. A power source for sliding movement of the third slider 440 is an electric motor (not illustrated). Alternatively, the power source may be another power source.

The cutting tool 441 for cutting the weld bead FB is detachably attached to a distal end portion (a distal end portion on the liner 11 side) of the third slider 440.

The first slider 420 includes roller units 422, 423. The roller units 422, 423 are respectively disposed on both sides (both sides in the X-direction) of the cutting tool 441. Herein, the roller unit 422 on the right side in FIG. 17 will be referred to as the first roller unit 422, and the roller unit 423 on the left side in FIG. 17 will be referred to as the second roller unit 423. The distance (the distance in the X-direction) between the cutting tool 441 and the first roller unit 422 and the distance (the distance in the X-direction) between the cutting tool 441 and the second roller unit 423 are equal to each other and are set to be relatively short. Specifically, these distances are set to be as short as possible within a range where the roller units 422, 423 do not interfere with the weld bead FB (later-described rollers 425a, 425b, 426a, 426b do not interfere with the weld bead FB) when the cutting tool 441 cuts the weld bead FB.

As illustrated in FIG. 18, the first roller unit 422 is configured such that the upper and lower rollers 425a, 425b in a pair are supported by a support arm 424 joined to a distal end surface (a distal end surface on the liner 11 side) of the first slider 420.

The support arm 424 includes a first horizontal portion 424a, a first vertical portion 424b, a second horizontal portion 424c, a second vertical portion 424d, a third vertical portion 424e, a third horizontal portion 424f, and a fourth horizontal portion 424g. The first horizontal portion 424a extends in the horizontal direction from the distal end surface of the first slider 420 along the Y-direction. The first vertical portion 424b extends vertically upward from a distal end portion (a distal end portion on the liner 11 side) of the first horizontal portion 424a. The second horizontal portion 424c extends in the horizontal direction from an upper end of the first vertical portion 424b along the Y-direction. The second vertical portion 424d and the third vertical portion 424e respectively extend vertically upward and downward from a distal end portion of the second horizontal portion 424c. The third horizontal portion 424f extends in the horizontal direction from an upper end of the second vertical portion 424d along the Y-direction and supports the roller 425a so that the roller 425a is rotatable about the X-axis. The fourth horizontal portion 424g extends in the horizontal direction from a lower end of the third vertical portion 424e along the Y-direction and supports the roller 425b so that the roller 425b is rotatable about the X-axis.

The positions of the rollers 425a, 425b in the Y-direction coincide with each other. That is, the distances from the distal end surface of the first slider 420 to the outer peripheral ends of the rollers 425a, 425b on the liner 11 side (the outer peripheral surfaces of the rollers 425a, 425b on the side facing the outer peripheral surface 11a of the liner 11) (a distance t in FIG. 17) are equal to each other.

The height positions of the rollers 425a, 425b are set so that the cutting tool 441 is located between the upper roller 425a and the lower roller 425b in a side view illustrated in FIG. 18. That is, the height position at which the cutting tool 441 is disposed is lower than the height position at which the upper roller 425a is disposed, and higher than the height position at which the lower roller 425b is disposed.

The second roller unit 423 has the configuration similar to the first roller unit 422 and is configured such that the upper and lower rollers 426a, 426b in a pair are supported by a support arm 426. The positions of the rollers 426a, 426b in the Y-direction respectively coincide with the positions of the rollers 425a, 425b in the Y-direction. That is, the distances from the distal end surface of the first slider 420 to the outer peripheral ends of the rollers 426a, 426b on the liner 11 side (the distance t in FIG. 17) are equal to each other.

The height positions of the rollers 426a, 426b are also set so that the cutting tool 441 is located between the upper roller 426a and the lower roller 426b in a side view. That is, the height position at which the cutting tool 441 is disposed is lower than the height position at which the upper roller 426a is disposed, and higher than the height position at which the lower roller 426b is disposed.

In this way, the four rollers 425a, 425b, 426a, 426b in total are respectively disposed on both sides of the cutting tool 441 in the X-direction and the Z-direction. Since the disposition positions of the rollers 425a, 425b, 426a, 426b are set as described above, a virtual plane connecting the outer peripheral ends of the rollers 425a, 425b, 426a, 426b on the liner 11 side to each other is a plane extending along the X-direction and the Z-direction (a plane extending along the vertical direction). The rollers 425a, 425b, 426a, 426b are made of the same material and have the same diameter. The material may be resin or metal.

A distance sensor (a surface position measuring device) 450 for measuring the distance to the outer peripheral surface 11a of the liner 11 is provided at a boundary portion between the second vertical portion 424d and the third vertical portion 424e of the support arm 424 of the first roller unit 422. The distance sensor 450 is formed by an ultrasonic sensor or an optical sensor and is a non-contact sensor that measures the distance to the outer peripheral surface 11a of the liner 11. Since the configuration of this non-contact sensor is known, a description thereof is omitted herein.

Further, a distance sensor 450 having the same configuration as described above is also provided at a boundary portion between a second vertical portion (corresponding to the second vertical portion 424d) and a third vertical portion (corresponding to the third vertical portion 424e) of the support arm 424 of the second roller unit 423.

The height positions at which the distance sensors 450 are disposed are set to coincide with each other. Further, the positions of the distance sensors 450 in the Y-direction are also set to coincide with each other. Therefore, when there is no deflection of the outer peripheral surface 11a of the liner 11 set in the weld bead cutting device 100 (when the outer peripheral surface 11a of the liner 11 is a cylindrical surface with no deflection), the distances to the outer peripheral surface 11a of the liner 11 detected by the distance sensors 450 become equal to each other.

In this embodiment, the distance sensor 450 is formed by the non-contact sensor, but it may be formed by a contact sensor.

The controller 500 in this embodiment includes, in addition to the respective functional parts in the first embodiment described above, a cutting tool advance and retreat control part 570, a surface position data acquisition part 581, a profile machining data creation part 582, a profile machining data offset processing part 583, and a measurement result determination part 584.

When the third slider 440 is caused to slide by the control by the cutting tool advance and retreat control part 570, only the third slider 440 slides in the Y-direction (slides relative to the first slider 420 and the second slider 430). This sliding movement causes the cutting tool 441 to slide in the Y-direction.

The surface position data acquisition part 581 acquires distance data measured by the distance sensors 450 (measurement data of the distances to the outer peripheral surface 11a of the liner 11) from the distance sensors 450, respectively.

Figure 19:
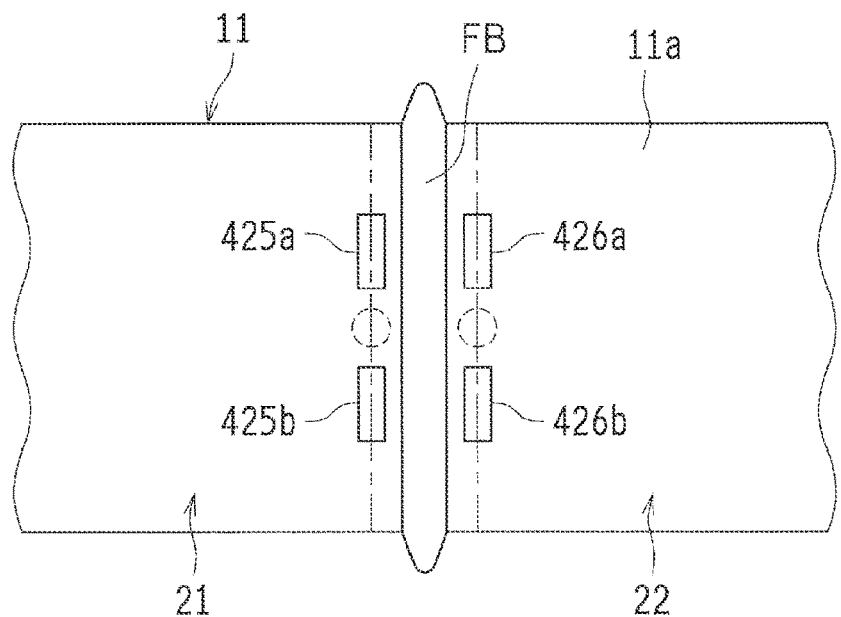
FIG. 19 is a diagram for explaining pressing positions of rollers on an outer peripheral surface of the liner in the third embodiment.

As described above, the distance sensors 450 are respectively provided at the boundary portions between the second vertical portion 424d and the third vertical portion 424e of the support arm 424 of the first roller unit 422 and between the second vertical portion and the third vertical portion of the support arm 426 of the second roller unit 423. Therefore, as illustrated in FIG. 19, in the state where the rollers 425a, 425b, 426a, 426b are pressed against the outer peripheral surface 11a on both sides (both sides in the X-direction) of the weld bead FB, respectively, the distance sensors 450 also face the outer peripheral surface 11a on both sides (both sides in the X-direction) of the weld bead FB, respectively. Broken lines in FIG. 19 respectively indicate regions to be targets for the distance sensors 450 to measure the distances, respectively.

Then, the distances to the outer peripheral surface 11a of the liner 11 on both sides (both sides in the direction along the butting direction) of the weld bead FB are respectively measured by the distance sensors 450, and the surface position data acquisition part 581 acquires the measurement data (the distance data). That is, the distance sensor 450 provided to the first roller unit 422 measures the distance to a position, in close vicinity to the weld bead FB, of the outer peripheral surface of the center liner portion 21. Likewise, the distance sensor 450 provided to the second roller unit 423 measures the distance to a position, in close vicinity to the weld bead FB, of the outer peripheral surface of the side liner portion 22. Then, in this state, the rotation rods 302 of the liner rotation units 300 are rotated to rotate the liner 11 about the horizontal axis (about the horizontal axis in the X-direction), and the distance sensors 450 respectively measure the distances over the entire circumference (per phase in the circumferential direction) with respect to a position, in close vicinity to the weld bead FB, of the outer peripheral surface of the center liner portion 21 and a position, in close vicinity to the weld bead FB, of the outer peripheral surface of the side liner portion 22 (measure the distances over the entire circumference with respect to positions on one-dot chain lines in FIG. 19). Then, the surface position data acquisition part 581 acquires these measurement data.

Based on the distance data (the measurement data) acquired from the distance sensors 450 by the surface position data acquisition part 581, the profile machining data creation part 582 extracts, out of both distance data to the positions of the outer peripheral surfaces in the same phase in the circumferential direction (located at positions adjacent to each other in the X-direction), the distance data on the side where the distance to the outer peripheral surface 11a of the liner 11 is shorter. That is, based on the distance data acquired from the distance sensors 450, the profile machining data creation part 582 compares information on the positions of the outer peripheral surfaces in the same phase in the circumferential direction and extracts the information on the position of the outer peripheral surface 11*a* located on the outer peripheral side (the side closer to the distance sensor 450).

Specifically, as described above, the distance sensor 450 provided to the first roller unit 422 measures the distance to a position, in close vicinity to the weld bead FB, of the outer peripheral surface of the center liner portion 21, and the distance sensor 450 provided to the second roller unit 423 measures the distance to a position, in close vicinity to the weld bead FB, of the outer peripheral surface of the side liner portion 22. In this case, out of the positions of the outer peripheral surfaces in the same phase in the circumferential direction (the position of the outer peripheral surface of the center liner portion 21 measured by the distance sensor 450 of the first roller unit 422, and the position of the outer peripheral surface of the side liner portion 22 measured by the distance sensor 450 of the second roller unit 423), the profile machining data creation part 582 extracts only the information measured by the distance sensor 450 of the first roller unit 422 when the distance to the outer peripheral surface of the center liner portion 21 measured by the distance sensor 450 of the first roller unit 422 is shorter. Conversely, the profile machining data creation part 582 extracts only the information measured by the distance sensor 450 of the second roller unit 423 when the distance to the outer peripheral surface of the side liner portion 22 measured by the distance sensor 450 of the second roller unit 423 is shorter. The information extraction operation described above is performed per predetermined phase over the entire circumference of the outer peripheral surface 11*a* of the liner 11.

The profile machining data offset processing part 583 calculates a distance (an offset amount) as distance data after the offset processing by subtracting a predetermined distance from the distance data per predetermined phase created by the profile machining data creation part 582. This is the processing for preventing excessive cutting of the outer peripheral surface 11*a* of the liner 11, taking into account a variation in the accuracy of the weld bead cutting device 100 (the positional accuracy of the tip of a cutting blade of the cutting tool 441). That is, the profile machining data is offset by a predetermined dimension so that a position located slightly closer to the cutting unit 400 (outwardly from the outer peripheral surface 11*a* of the liner 11) than a cutting position (a position of the tip of the cutting blade of the cutting tool 441) according to the distance data per predetermined phase created by the profile machining data creation part 582 is set as a position of the tip of the cutting blade of the cutting tool 441 The data subjected to the offset processing corresponds to "machining data obtained by correcting the profile machining data" referred to in the disclosure.

Then, in the cutting process of the weld bead FB, the machining data created as described above is transmitted to the cutting tool advance and retreat control part 570, and the weld bead FB is cut while adjusting the advance-retreat position of the cutting tool 441 relative to the outer peripheral surface 11*a* of the liner 11 so that the distance between the position of the outer peripheral surface 11*a* per phase in the circumferential direction of the liner 11 in the machining data and the position of the tip of the cutting blade of the cutting tool 441 is maintained constant.

The measurement result determination part 584 is a processing part that determines, after the completion of the cutting process of the weld bead FB, whether or not the cutting operation of the weld bead FB has been properly performed. This determination is a process of inspecting the presence or absence of the unevenness of the outer peripheral surface of the liner 11 in a non-contact or contact manner.

Weld Bead Cutting Operation

Next, the cutting operation of the weld bead FB performed by the weld bead cutting device 100 according to this embodiment will be described. As described above, in this embodiment, after the cutting machining in which the weld bead FB is cut while moving the cutting tool 441 along the width direction of the weld bead FB (the rough machining) is performed, the cutting machining in which the weld bead FB is cut by moving the cutting tool 441 along the height direction of the weld bead FB to remove the weld bead FB almost completely so that the outer peripheral surface of the liner 11 has a smooth curved surface by preventing the weld bead FB from remaining on the outer peripheral surface of the liner 11 (the finish machining) is performed. Since the rough machining is the same as the first embodiment or the second embodiment described above, a description thereof is omitted herein. Accordingly, only the finish machining will be described below.

Figure 20:
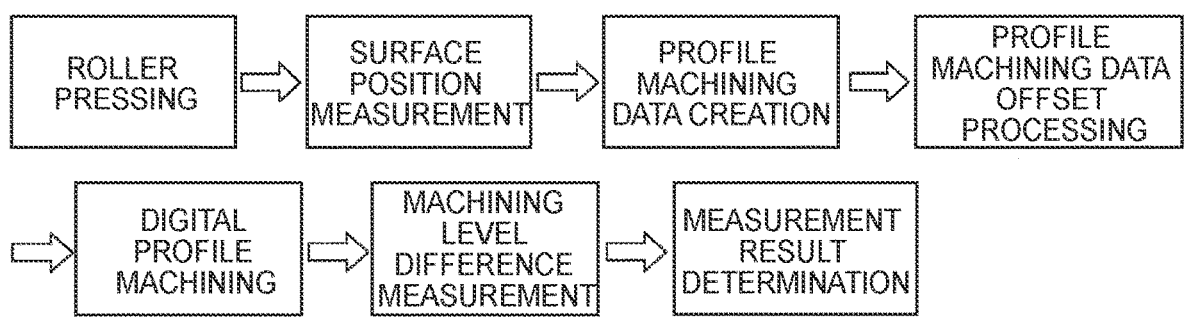
FIG. 20 is a diagram illustrating the sequence of finish machining in the third embodiment.

As illustrated in FIG. 20 (a diagram illustrating the sequence of the finish machining), processes of "roller pressing", "surface position measurement", "profile machining data creation", "profile machining data offset processing", "digital profile machining", "machining level difference measurement", and "measurement result determination" are performed in this order in the finish machining. A specific description will be given below.

In the finish machining, first, before operating the electric motors (before rotating the liner 11), the first slider 420 is caused to slide in the direction (the Y-direction) toward the liner 11 by the control by the cutting unit advance and retreat control part 510. Consequently, the sliders 420, 430, 440 slide integrally in the direction toward the liner 11. By this sliding movement, as illustrated in FIG. 21, the rollers 425*a*, 425*b*, 426*a*, 426*b* come in contact with the outer peripheral surface 11*a* of the liner 11 (roller pressing).

Figure 21:
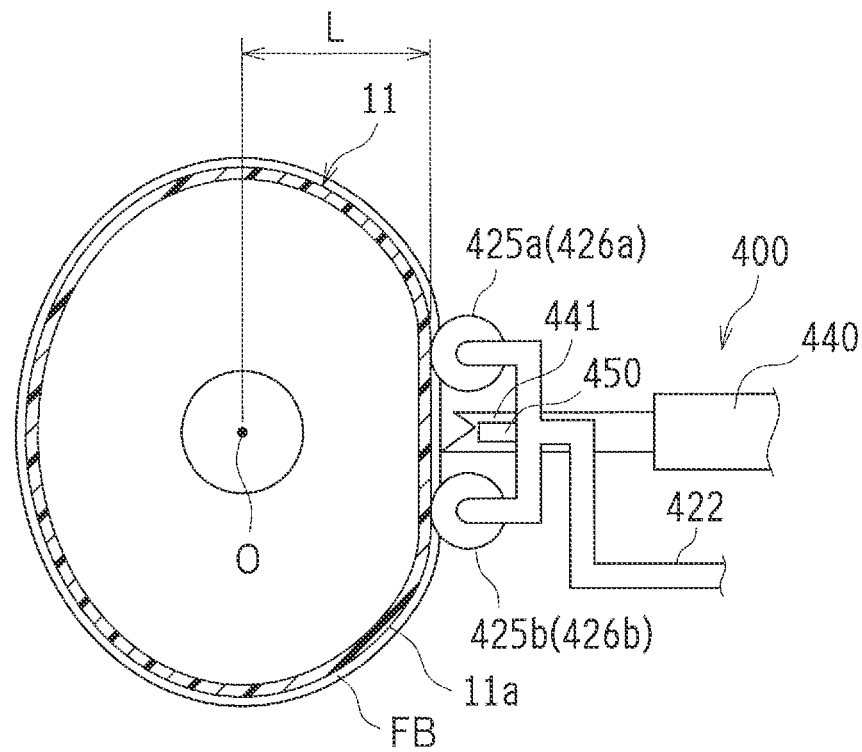
FIG. 21 is a diagram for explaining a roller pressing process and a surface position measurement process in the third embodiment, and is a diagram taken along the line A-A in FIG. 17.

Then, the cutting unit advance and retreat control part 510 causes the first slider 420 to slide so that the distance (the distance in the Y-direction) between the rotation center (the central axis) O of the liner 11 (that coincides with the rotation centers of the rotation rods 302) and each of the rollers 425*a*, 425*b*, 426*a*, 426*b* becomes a predetermined distance (a distance L in FIG. 21). The distance L is determined in advance by experiments or simulations as a value that causes a region of the outer peripheral surface 11*a* of the liner 11 surrounded by the rollers 425*a*, 425*b*, 426*a*, 426*b* (a generally rectangular region with vertices at positions where the outer peripheral surfaces of the rollers 425*a*, 425*b*, 426*a*, 426*b* press the outer peripheral surface 11*a* of the liner 11, respectively) to become a flat surface (a value that enables the region to be compulsorily deformed to a flat surface) when the outer peripheral surface 11*a* of the liner 11 is pressed by the rollers 425*a*, 425*b*, 426*a*, 426*b*. At this time point, the cutting tool 441 is at a position retreated from the outer peripheral surface 11*a* of the liner 11 by a predetermined distance. In this way, in the state where the outer peripheral surface 11*a* of the liner 11 is pressed by the rollers 425*a*, 425*b*, 426*a*, 426*b*, there is almost no unevenness on the outer peripheral surface 11*a* of the liner 11 surrounded by the rollers 425*a*, 425*b*, 426*a*, 426*b* (the outer peripheral surface 11*a* becomes a flat surface as described above). That is, only the weld bead FB projects on the outer peripheral surface 11*a* with no unevenness.

In this state, a shift is made to the surface position measurement process. As described above, the surface position measurement is performed such that the distances to the outer peripheral surface 11a of the liner 11 on both sides (both sides in the direction along the butting direction) of the weld bead FB are respectively measured by the distance sensors 450, and that the surface position data acquisition part 581 acquires the measurement data (the distance data). That is, while rotating the liner 11 about the horizontal axis in the state of FIG. 21, the distances to the outer peripheral surfaces of the liner 11 are measured by the distance sensors 450, and the measurement data over the entire circumference of the liner 11 (the measurement data over the entire circumference with respect to the positions on the one-dot chain lines in FIG. 19) is transmitted to the surface position data acquisition part 581.

The profile machining data creation process thereafter is the process performed by the profile machining data creation part 582, and as described above, based on the distance data acquired from the distance sensors 450 by the surface position data acquisition part 581, the profile machining data creation part 582 extracts, out of both distance data to the positions of the outer peripheral surfaces in the same phase in the circumferential direction (located at the positions adjacent to each other in the X-direction), the distance data on the side where the distance to the outer peripheral surface 11a of the liner 11 is shorter. That is, based on the distance data acquired from the distance sensors 450, the profile machining data creation part 582 compares information on the positions of the outer peripheral surfaces in the same phase in the circumferential direction and extracts the information on the position of the outer peripheral surface 11a located on the outer peripheral side (the side closer to the distance sensor 450).

The profile machining data offset processing is the process performed by the profile machining data offset processing part 583, and as described above, the profile machining data offset processing part 583 calculates a distance as distance data after the offset processing by subtracting a predetermined distance from the distance data per predetermined phase created by the profile machining data creation part 582.

After the profile machining data creation and the profile machining data offset processing are performed in this way, the digital profile machining is performed. In the digital profile machining, while rotating the liner 11, the cutting tool 441 is advanced and retreated in the Y-direction according to the distance data obtained by the profile machining data offset processing. That is, the cutting tool advance and retreat control part 570 performs the control according to this distance data to cause the third slider 440 to slide so that the advance-retreat position of the cutting tool 441 is adjusted. That is, the weld bead FB is cut while adjusting the advance-retreat position of the cutting tool 441 relative to the outer peripheral surface 11a of the liner 11 so that the distance between the position of the outer peripheral surface 11a per phase in the circumferential direction of the liner 11 in the machining data (the distance data after the offset processing) and the position of the tip of the cutting blade of the cutting tool 441 is maintained constant.

The rotation speed of the liner 11 in the digital profile machining is equal to the rotation speed of the liner 11 in the surface position measurement process. Since the centrifugal force that acts on the liner 11 varies according to the rotation speed, this is for making centrifugal forces equal to each other in the digital profile machining and the surface position measurement process so that the displacement amounts of the outer peripheral surface 11a of the liner 11 due to the influence of the centrifugal force are made equal to each other.

Therefore, when the outer peripheral surface 11a of the liner 11 is spaced away from the cutting tool 441 (when there is deflection of the outer peripheral surface 11a of the liner 11 in the direction away from the cutting tool 441), the cutting tool 441 is advanced (the third slider 440 slides in the direction toward the liner 11). Conversely, when the outer peripheral surface 11a of the liner 11 approaches the cutting tool 441 (when there is deflection of the outer peripheral surface 11a of the liner 11 in the direction toward the cutting tool 441), the cutting tool 441 is retreated (the third slider 440 slides in the direction away from the liner 11).

Figure 22:
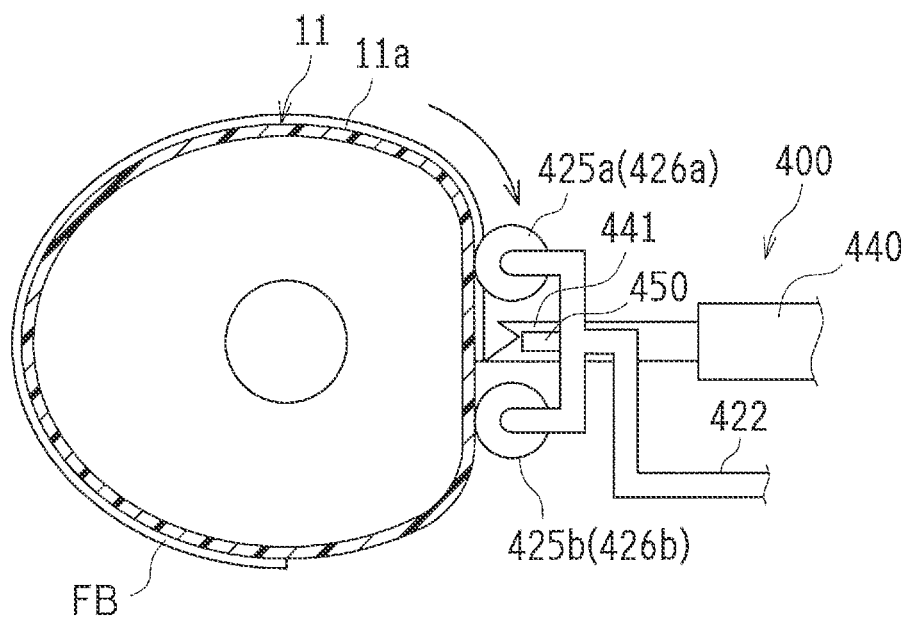
FIG. 22 is a diagram corresponding to FIG. 21 and illustrates a state in which the liner is rotated by 90 degrees after the start of the finish machining.

FIG. 22 is a diagram corresponding to FIG. 21 and illustrates a state in which the liner 11 is rotated by 90 degrees after the start of the digital profile machining.

Figure 23:
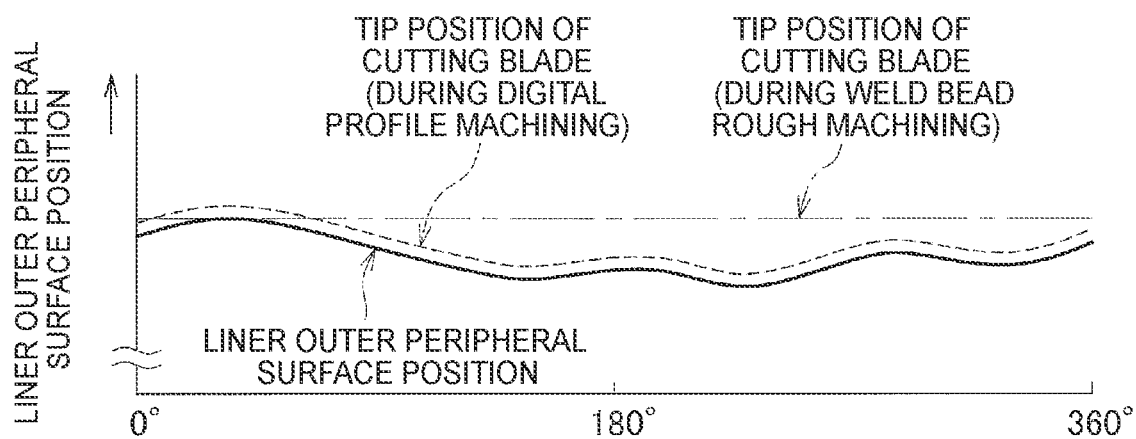
FIG. 23 is a diagram illustrating the relationship between the outer peripheral surface position of the liner and the tip position of a cutting blade of a cutting tool after finish machining data is subjected to offset processing.

In this way, since the weld bead FB is cut while adjusting the advance-retreat position of the cutting tool 441 relative to the outer peripheral surface 11a of the liner 11 so that the distance between the position of the outer peripheral surface 11a per phase in the circumferential direction of the liner 11 and the position of the tip of the cutting blade of the cutting tool 441 is maintained constant, as illustrated in FIG. 23 (a diagram illustrating the relationship between the outer peripheral surface position of the liner 11 and the tip position of the cutting blade of the cutting tool 441 after the profile machining data is subjected to the offset processing), the weld bead FB is cut while the cutting tool 441 follows the outer peripheral surface 11a of the liner 11. In FIG. 23, a solid line indicates a variation in the position (a state of deflection) of the outer peripheral surface 11a of the liner 11, and a broken line indicates the tip positions of the cutting blade of the cutting tool 441. A one-dot chain line in FIG. 23 indicates the tip positions of the cutting blade of the cutting tool 441 in the rough machining.

Figure 24:
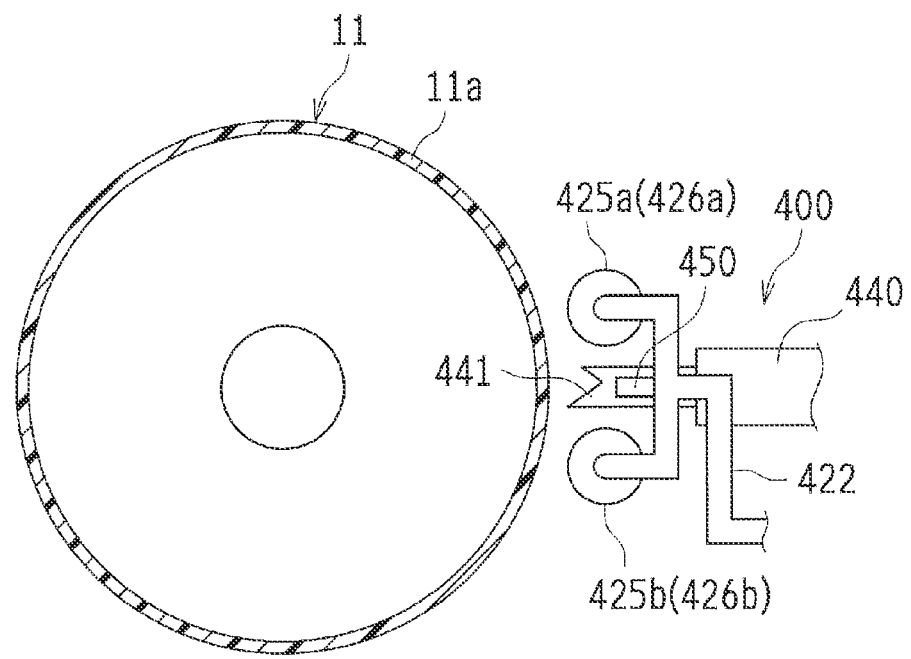
FIG. 24 is a diagram corresponding to FIG. 21 and illustrates a state in which the finish machining is completed.

FIG. 24 is a diagram corresponding to FIG. 21 and illustrates a state in which the digital profile machining is completed. Although not illustrated in FIG. 24, the weld bead FB slightly remains at a dimension of the offset amount defined in the profile machining data offset processing described above. If the advance-retreat position of the cutting tool 441 is adjusted so that the tip position of the cutting blade of the cutting tool 441 is aligned with the proximal end position of the weld bead FB, it is possible to remove the weld bead FB almost completely. That is, the level difference due to the weld bead FB does not occur.

The machining level difference measurement is an operation of measuring the level difference of the outer peripheral surface 11a due to the weld bead FB being partially left uncut, and inspects the presence or absence of the unevenness of the outer peripheral surface 11a of the liner 11 in a non-contact or contact manner. The measurement result determination determines whether or not the level difference measured by the machining level difference measurement is equal to or less than a predetermined allowable level difference. When the level difference is equal to or less than the predetermined allowable level difference, it is determined to be normal. When the level difference exceeds the predetermined allowable level difference, it is determined to be abnormal. This information is displayed on a monitor or the like (not illustrated) installed in the weld bead cutting device 100.

By the finish machining of this embodiment, even when the sections of the center liner portion 21 and the side liner portion 22 are not a perfect circle, or the distance between the rotation center O and the outer peripheral surface 11a of the liner 11 is non-uniform over the entire circumference of the liner 11 (the distance is non-uniform even when the section of the liner 11 is a perfect circle), it is possible to cut the weld bead FB well with high accuracy over its entirety in the circumferential direction.

Other Embodiments

The disclosure is not limited to the above-described embodiments, and all modifications and applications are made possible within the scope of the claims and its equivalent scope.

For example, in the third embodiment, in the finish machining in which the weld bead FB is cut by moving the cutting tool 441 along the height direction of the weld bead FB (the radial direction of the liner 11), the outer peripheral surface 11a of the liner 11 is compulsorily deformed to a flat surface by the pressing of the rollers 425a, 425b, 426a, 426b. The disclosure is not limited thereto. Without compulsorily deforming the outer peripheral surface 11a of the liner 11 to a flat surface, the finish machining may be performed by moving the cutting tool 441 along the height direction of the weld bead FB. In this case, since not only both end positions of the weld bead FB in its width direction, but also the distance to the outer peripheral surface 11a of the liner 11 can be measured by the distance sensor 600, it is possible to make the distance sensors 450 unnecessary. In this case, with respect to the timings of the measurement of both end positions of the weld bead FB in its width direction and the measurement of the distance to the outer peripheral surface 11a of the liner 11 by the distance sensor 600, the measurement of both end positions of the weld bead FB in its width direction may be performed before the rough machining, and the measurement of the distance to the outer peripheral surface 11a of the liner 11 may be performed before the finish machining, or alternatively, the measurement of both end positions of the weld bead FB in its width direction and the measurement of the distance to the outer peripheral surface 11a of the liner 11 may be performed simultaneously.

In each of the above-described embodiments, the cutting tool 441 is the bit. The disclosure is not limited thereto. An end mill or a router may be employed as the cutting tool 441.

In the third embodiment, the cutting unit 400 includes the four rollers 425a, 425b, 426a, 426b. The disclosure is not limited thereto. One roller may be disposed on each of both sides (both sides in the X-direction) of the cutting tool 441 so that the two rollers in total are disposed. Alternatively, three rollers or five or more rollers may be disposed around the cutting tool 441. The rotary members that press the outer peripheral surface 11a of the liner 11 are not limited to the rollers 425a, 425b, 426a, 426b. Ball bearings may be employed, and outer races of the ball bearings may be pressed against the outer peripheral surface 11a of the liner 11.

In each of the above-described embodiments, the description has been given of the example in which the weld bead cutting device 100 is for cutting the weld bead FB of the liner 11 that is formed by integrally joining the three resin molded products (the liner portions 21, 22, 23). The disclosure is not limited thereto and can also be applied to a weld bead cutting device for cutting a weld bead of a liner that is formed by integrally joining two resin molded products or a weld bead of a liner that is formed by integrally joining four or more resin molded products. Further, the disclosure is also applicable to a weld bead cutting device for cutting a weld bead of a liner of a tank other than a hydrogen tank.

The disclosure is applicable to a weld bead cutting device and a weld bead cutting method configured to remove, by cutting, a weld bead that is generated on the outer circumference of a welding portion of a resin liner.

What is claimed is:

1. A weld bead cutting device configured to cut a weld bead generated on an outer circumference of a welding portion when annular end edges of two resin members on open sides of the two resin members are butted and welded to each other, the weld bead cutting device configured to cut the weld bead by rotating a workpiece, formed by at least the two resin members welded to each other, about a central axis extending in a direction along a butting direction of the two resin members, and by moving a cutting tool at a predetermined feed pitch along a bead width direction being the direction along the butting direction per rotation of the workpiece, the weld bead cutting device comprising:

a bead end edge position measuring device configured to measure a position of at least one of both end edges of the weld bead in the bead width direction over an entire circumference of the workpiece in a circumferential direction of the workpiece;

a bead profile information creation part configured to, based on information on the position of the end edge of the weld bead in the bead width direction over the entire circumference of the workpiece in the circumferential direction measured by the bead end edge position measuring device, create bead profile information being information on a shape of the end edge of the weld bead over the entire circumference of the workpiece in the circumferential direction;

a machining information creation part configured to, based on the bead profile information created by the bead profile information creation part, create machining information of the workpiece per rotation of the workpiece being position information of the cutting tool in the bead width direction per phase in the circumferential direction of the workpiece so that a moving locus of the cutting tool relative to the workpiece along the circumferential direction of the workpiece approximates the shape of the end edge of the weld bead over the entire circumference of the workpiece in the circumferential direction per rotation of the workpiece rotating about the central axis; and a cutting tool feed control part configured to, according to the machining information created by the machining information creation part, control a position of the cutting tool in the bead width direction per rotation of the workpiece rotating about the central axis.

2. The weld bead cutting device according to claim 1, wherein the machining information creation part is configured to create machining information in which the feed pitch of the cutting tool per rotation of the workpiece is set to a dimension that causes a width of a cutting chip to become equal to or less than a predetermined dimension, the cutting chip generated to have the width corresponding to the feed pitch, and in which the feed pitch of the cutting tool per rotation of the workpiece is set to be constant from a cutting start position of the cutting tool to a cutting end position of the cutting tool in the bead width direction.

3. The weld bead cutting device according to claim 1, wherein:

the bead end edge position measuring device is configured to measure the positions of both end edges of the weld bead in the bead width direction over the entire circumference of the workpiece in the circumferential direction;

the bead profile information creation part is configured to, based on information on the positions of both end edges of the weld bead in the bead width direction over the entire circumference of the workpiece in the circumferential direction measured by the bead end edge position measuring device, create bead profile information being information on the shapes of both end edges of the weld bead over the entire circumference of the workpiece in the circumferential direction; and the machining information creation part is configured to create machining information in which the feed pitch of the cutting tool per phase in the circumferential direction of the workpiece is changed so that the position of the cutting tool in the bead width direction per phase in the circumferential direction of the workpiece from a cutting start position to a cutting end position in the bead width direction is located closer to a center side of the weld bead than the positions of both end edges of the weld bead per rotation of the workpiece.

4. The weld bead cutting device according to claim 1, further comprising:

surface position measuring devices configured to respectively measure, along the circumferential direction, positions of outer peripheral surfaces of the two resin members on both sides of the welding portion in the direction along the butting direction;

a profile machining data creation part configured to, based on information on the positions of the outer peripheral surfaces on both sides of the welding portion measured by the surface position measuring devices, create profile machining data by comparing information on the positions of the outer peripheral surfaces in a same phase in the circumferential direction and extracting the information on the position of the outer peripheral surface located on an outer peripheral side; and a cutting tool advance and retreat control part configured to, according to the profile machining data created by the profile machining data creation part or machining data obtained by correcting the profile machining data, adjust an advance-retreat position of the cutting tool relative to the outer peripheral surface of the workpiece rotating about the central axis so that a distance between the position of the outer peripheral surface per phase in the circumferential direction in the data and a position of a cutting blade of the cutting tool is maintained constant.

5. The weld bead cutting device according to claim 1, wherein the workpiece is a liner used for a hydrogen tank.

6. A weld bead cutting method configured to cut a weld bead generated on an outer circumference of a welding portion when annular end edges of two resin members on open sides of the two resin members are butted and welded to each other, the weld bead cutting method configured to cut the weld bead by rotating a workpiece, formed by at least the two resin members welded to each other, about a central axis extending in a direction along a butting direction of the two resin members, and by moving a cutting tool at a predetermined feed pitch along a bead width direction being the direction along the butting direction per rotation of the workpiece, the weld bead cutting method comprising:

a bead end edge position measuring step of measuring a position of at least one of both end edges of the weld bead in the bead width direction over an entire circumference of the workpiece in a circumferential direction of the workpiece;

a bead profile information creation step of, based on information on the position of the end edge of the weld bead in the bead width direction over the entire circumference of the workpiece in the circumferential direction measured by the bead end edge position measuring step, creating bead profile information being information on a shape of the end edge of the weld bead over the entire circumference of the workpiece in the circumferential direction;

a machining information creation step of, based on the bead profile information created by the bead profile information creation step, creating machining information of the workpiece per rotation of the workpiece being position information of the cutting tool in the bead width direction per phase in the circumferential direction of the workpiece so that a moving locus of the cutting tool relative to the workpiece along the circumferential direction of the workpiece approximates the shape of the end edge of the weld bead over the entire circumference of the workpiece in the circumferential direction per rotation of the workpiece rotating about the central axis; and a cutting tool feed control step of, according to the machining information created by the machining information creation step, controlling a position of the cutting tool in the bead width direction per rotation of the workpiece rotating about the central axis.

* * * * *